(12) United States Patent
Ahn et al.

(10) Patent No.: US 10,842,321 B2
(45) Date of Patent: Nov. 24, 2020

(54) SMART BLENDER AND OPERATION METHOD THEREOF

(71) Applicant: NEURU CO., LTD., Siheung-si (KR)

(72) Inventors: Joung Geun Ahn, Ansan-si (KR); Byung Hyun An, Ansan-si (KR)

(73) Assignee: NEURU CO., LTD., Siheung-si (KR)

( * ) Notice: Subject to any disclaimer, the term of this patent is extended or adjusted under 35 U.S.C. 154(b) by 486 days.

(21) Appl. No.: 15/752,742

(22) PCT Filed: Dec. 16, 2015

(86) PCT No.: PCT/KR2015/013782
§ 371 (c)(1),
(2) Date: Feb. 14, 2018

(87) PCT Pub. No.: WO2016/099145
PCT Pub. Date: Jun. 23, 2016

(65) Prior Publication Data
US 2018/0255974 A1 Sep. 13, 2018

(30) Foreign Application Priority Data

Dec. 17, 2014 (KR) .................. 10-2014-0181958
Feb. 9, 2015 (KR) .................. 10-2015-0019440
Jul. 30, 2015 (KR) .................. 10-2015-0107859

(51) Int. Cl.
*A47J 43/00* (2006.01)
*A47J 43/07* (2006.01)
*A47J 43/046* (2006.01)
*A47J 43/08* (2006.01)

(52) U.S. Cl.
CPC ......... *A47J 43/0716* (2013.01); *A47J 43/046* (2013.01); *A47J 43/085* (2013.01)

(58) Field of Classification Search
CPC .. B01F 11/0082; A47J 43/0716; A47J 43/046; A47J 43/085
USPC ........ 366/209, 218, 216, 198, 291, 238, 224
See application file for complete search history.

(56) References Cited

U.S. PATENT DOCUMENTS 7,217,029 B2 * 5/2007 Grandjean ................ B01F 7/30
366/224

FOREIGN PATENT DOCUMENTS

| JP | 2002-066290 A | 3/2002 |
| KR | 20-0126936 Y1 | 9/1998 |
| KR | 10-2010-0107655 A | 10/2010 |
| KR | 10-1065898 B1 | 9/2011 |
| KR | 20-2012-0000011 U | 1/2012 |

* cited by examiner

*Primary Examiner* — Anshu Bhatia
(74) *Attorney, Agent, or Firm* — Novick, Kim & Lee, PLLC; Jae Youn Kim

(57) ABSTRACT

A smart blender of the present invention pulverizes or blends food contained therein by a rotating blade. When the blender is slanted by an external force and the external force is then removed, the blender blends food contained therein while repeatedly shaking side to side.

22 Claims, 42 Drawing Sheets

A-A'

SMART BLENDER AND OPERATION METHOD THEREOF

TECHNICAL FIELD

The present invention relates to a blender, and more particularly, to a smart blender capable of evenly blending and/or pulverizing food contained therein and a method of operating the same.

BACKGROUND ART

In general, a blender blends and/or pulverizes food as an electric motor is rotated by a power supply and a blade, that is, a pulverizing blade is rotated by the electric motor.

However, according to a conventional blender, since the pulverizing blade is rotated while being fixed at a certain position, the food is placed at an outer periphery of the pulverizing blade by centrifugal force of the pulverizing blade after being pulverized for a predetermined period of time.

Thus, it is troublesome that a user holds the blender and shakes or applies an impact to the blender to move the food placed on the outer periphery to the position of the blade in order to pulverize the still less pulverized food.

As described above, because the blender is held and shaken or an impact is applied to it, it is inconvenient to use the blender and there is a risk that the blender may be damaged due to the strong impact applied thereto.

In addition, when the blender is large in size, it is difficult to hold and shake the blender.

Moreover, when the contents such as food or the like are not pulverized well, the lifetime of the motor may be shorten and the electric charge may be increased by rotating the motor at an extremely high speed from time to time.

DISCLOSURE

Technical Problem

To solve the above-mentioned problems, an object of the present invention is to provide a smart blender which is shaken repeatedly side to side such that food can be continuously mixed and pulverized well, and can be easily shaken even though the size is large.

Another object of the present invention is to provide a smart blender which can be repeatedly rotated up and down to continuously and uniformly mix food such that the fool is pulverized well, and can perform the mixture and pulverization well such that the lifetime of a motor is increased and the electric charge is reduced.

Still another object of the present invention is to provide a smart blender which is arranged to be inclined in the left and right direction with respect to a vertical line such that food can be pulverized while being mixed well, and a method of operating the same.

Technical Solution

In accordance with one aspect of the present invention, there is provided a smart blender which pulverizes or blends food contained therein by a rotating blade, wherein, when the smart blender is slanted by an external force and the external force is removed, the smart blender blends the food contained therein while repeatedly shaking side to side.

The smart blender includes a main body containing a motor; a containing part coupled to an upper portion of the main body to contain food; and the blade installed to the main body or the containing part and rotated by the motor to pulverize or blend the food, wherein a center of gravity of the smart blender is located below a midpoint of an entire vertical length thereof, and a lower surface of the main body, which is in contact with a bottom surface, has a round shape.

The lower surface of the main body may have a shape of a dome protruding downward.

Alternatively, the smart blender includes a main body containing a motor; a containing part coupled to an upper portion of the main body to contain food; the blade installed to the main body or the containing part and rotated by the motor to pulverize or blend the food; a first support disposed on a lower portion of the main body; and a connecting member for connecting the first support to the main body, wherein the connecting member allows the main body to shake side to side based on the first support by the external force.

The connecting member is formed of an elastic material such that the connecting member is elastically deformed by the external force and elastically restored when the external force is removed, has one end coupled to the first support and an opposite end coupled to the main body, and is elastically deformed by the external force when the main body is slanted by the external force, and the main body shakes side to side by an elastic restoring force of the elastic material when the external force is removed.

The connecting member is formed of a coil spring disposed vertically.

The connecting member has the one end coupled to an upper surface of the first support and the opposite end coupled to a lower surface of the main body to support the main body such that the main body stands up with respect to the first supporting a free state.

The connecting member is elastically compressed by an external force pressing the containing part.

The first support includes a stopper that restricts an angle at which the main body shakes side to side.

The connecting member is elastically compressed in a vertical direction by the external force pressing the containing part.

Alternatively, the smart blender includes a main body containing a motor; a containing part coupled to an upper portion of the main body to contain food; the blade installed to the main body or the containing part and rotated by the motor to pulverize or blend the food; a second support disposed in a lateral direction of the main body; a rotation shaft for rotatably connecting the main body or the containing part to the second support; wherein the rotation shaft is located above a center of gravity in a state where the main body and the containing part are combined with each other, and the main body and the containing part shake side to side based on the rotation shaft by the external force.

In accordance with another aspect of the present invention, there is provided a smart blender which pulverizes or blends food contained therein by a rotating blade, the smart blender including a main body containing a motor; a containing part coupled to an upper portion of the main body to contain food; the blade installed to the main body or the containing part and rotated by the motor to pulverize or blend the food; and a third support coupled to a lower portion of the main body, wherein the lower portion of the main body is slanted against the third support by an external force.

The lower portion of the main body is ball joint coupled to the third support.

A dome-shaped insertion protrusion is formed on the lower portion of the main body, and an insertion groove is formed in an upper portion of the third support such that the insertion protrusion is rotated while being inserted into the insertion groove.

The insertion protrusion is formed with a fixing groove, the third support is formed with a fixing protrusion inserted into the fixing groove, and the fixing protrusion is inserted into the fixing groove such that the main body remains in a state.

A lower portion of the main body is formed in a dome shape and is formed with a rotation protrusion having a gear, a driving motor gear-engaged with the rotation protrusion is installed on the third support, and the main body is slanted against the third support by a rotation of the rotation protrusion.

In accordance with still another aspect of the present invention, there is provided a smart blender which pulverizes or blends food contained therein by a rotating blade, the smart blender including a main body containing a motor; a containing part coupled to the main body to contain food; the blade installed to the main body or the containing part and rotated by the motor to pulverize or blend the food; a base part disposed on a lower portion of the main body; and a driving part disposed between the base part and the main body to support the main body vertically with respect to the base part, wherein the driving part supports the main body such that the main body moves vertically and horizontally with respect to the base part, and the food contained in the containing part is blended as the main body moves vertically or horizontally by the driving part.

The driving part is formed of an elastic material such that the driving part is elastically deformed by the external force and elastically restored when the external force is removed, and has one end coupled to the base part and an opposite end coupled to the main body.

The driving part includes a coil spring, and has a lower end coupled to an upper surface of the base part and an upper end coupled to an upper surface of the main body.

The base part includes a suction plate and is tightly fixed to a bottom surface.

The smart blender further includes a hinge part for hinge-coupling the main body to the base part such that the main body is rotatable vertically with respect to the base part, wherein the driving part supports the main body such that the main body moves vertically with respect to the base part about the hinge part, and the food contained in the containing part is blended as the main body is vertically rotated about the hinge part.

The driving part includes a spring having one end coupled to the base part and an opposite end coupled to the main body, and the main body is repeatedly rotated in the vertical direction about the hinge part by an elastic restoring force of the spring.

The spring includes a coil spring, and has a lower end coupled to an upper surface of the base part and an upper end coupled to a lower surface of the main body.

Alternatively, the driving part is a motor-driven variable member, a length of which is varied by power, the motor-driven variable member has one end making contact with the base part and an opposite end making contact with the main body, and the main body repeatedly rotates in the vertical direction about the hinge part by a change of the length of the motor-driven variable member.

The motor-driven variable member has a lower end hinge-coupled to an upper surface of the base part and an upper end hinge-coupled to a lower surface of the main body.

A torsion spring is mounted on the hinge part such that the main body is elastically supported in a vertical direction with respect to the base part.

A suction plate is coupled to the base part.

The smart blender further includes a hinge part for hinge-coupling the main body to the base part such that the main body is rotatable horizontally with respect to the base part, wherein the driving part supports the main body such that the main body moves horizontally with respect to the base part about the hinge part, and the food contained in the containing part is blended as the main body is horizontally rotated about the hinge part.

In accordance with still another aspect of the present invention, there is provided a smart blender which pulverizes or blends food contained therein by a rotating blade, the smart blender including a main body containing a first motor; a containing part detachably coupled to an upper portion of the main body to contain food; the blade installed into the containing part and rotated by the motor to pulverize or blend the food; a support coupled to the main body to rotatably support the main body; and a tilt forming part for tilting the main body with respect to the support such that the main body is disposed to be inclined with respect to the support, wherein the main body and the containing part are disposed to be inclined with respect to the support by the tilt forming part.

The tilt forming part includes a driving part for rotating the main body such that the main body is vertically tilted, and the main body is disposed to be inclined with respect to the support by an operation of the driving part.

The driving part includes a second motor.

The tilt forming part includes a driving gear installed to the second motor; and a driven gear coupled to a lower portion of the main body and engaged with the driving gear, wherein the main body is rotated while being inclined with respect to the support as the driven gear moves by a rotation of the driving gear by the second motor.

The smart blender further includes a measuring part for detecting rotation data of the blade; and a control part for controlling an operation of the driving part, wherein, when a rotation state of the blade detected by the measuring part is out of a preset reference range, the control part operates the driving part such that the main body is disposed to be inclined with respect to the support.

The measuring part detects a rotation speed of the blade, and when the rotation speed detected by the measuring part is higher than a preset reference speed, the control part operates the driving part such that the main body is inclined with respect to the support.

The measuring part detects a torque of the first motor for rotating the blade, and when the torque of the blade detected by the measuring part is smaller than a preset reference torque, the control part operates the driving part such that the main body is inclined with respect to the support.

The measuring part detects a current value applied to the first motor for rotating the blade, and when the current value detected by the measuring part is smaller than a preset reference current value, the control part operates the driving part such that the main body is inclined with respect to the support.

The smart blender further includes a timer for operating the driving part every predetermined time period.

The main body repeatedly shakes side to side with respect to the support by an operation of the driving part.

The tilt forming part maintains the main body in a state where the main body is inclined at a predetermined angle with respect to the support.

The support is hinge coupled to a lower portion of the main body to support the main body, and the tilt forming part is installed to a hinge coupling portion between the main body and the support such that the main body is maintained inclined with respect to the support.

Alternatively, the support includes a support plate disposed on a lower portion of the main body; and a support protrusion protruding upwardly from the support plate, wherein a side portion of the main body is hinge coupled to the support protrusion, an elastic member is disposed between the lower portion of the main body and the support plate to elastically and upward support the main body, the tilt forming part is installed to a hinge coupling portion between the main body and the support such that the main body is maintained inclined with respect to the support, and a force maintaining a stationary state of the main body by the tilt forming part is greater than an elastic force of the elastic member.

The tilt forming part includes a latch member installed to one of the main body and the support and formed with a plurality of latch grooves; and a latch adjustment member installed to the other of the main body and the support and inserted into the latch groove, wherein, when the main body is rotated, the latch adjustment member is inserted into the latch groove to maintain the main body and the containing part in an inclined state.

The latch adjustment member includes a plate spring on which a latch protrusion is formed.

Alternatively, the latch adjustment member includes a ball member inserted into the latch groove; and a spring for elastically supporting the ball member in a direction of the latch groove.

A dome-shaped insertion protrusion is formed on a lower portion of the main body, an insertion groove is formed in an upper portion of the support such that the insertion protrusion is rotated while being inserted into the insertion groove, and when the main body is rotated, the insertion protrusion is rotated in the insertion groove such that a rotation state of the insertion protrusion is maintained by the tilt forming part.

The tilt forming part includes an outer peripheral surface of the insertion protrusion and an inner peripheral surface of the insertion groove which are in contact with each other, and the main body is maintained in an inclined state by friction caused by contact occurring between the outer peripheral surface of the insertion protrusion and the inner peripheral surface of the insertion groove.

Alternatively, the tilt forming part includes a fixing groove formed in the insertion protrusion; and a fixing protrusion protruding from the support and inserted into the fixing groove, wherein the fixing protrusion is inserted into the fixing groove such that a state of the main body is maintained.

The tilt forming part includes a driving motor for rotating the main body with respect to the support, and when the driving motor is stopped, the main body is maintained in an inclined state.

In accordance with still another aspect of the present invention, there is provided a method of operating a smart blender which includes a main body containing a first motor; a containing part detachably coupled to an upper portion of the main body to contain food; a blade installed into the containing part and rotated by the motor to pulverize or blend the food; a support coupled to the main body to rotatably support the main body; and a tilt forming part for tilting the main body with respect to the support such that the main body is disposed to be inclined with respect to the support, where the method includes pulverizing or blending the food by a rotation of the blade in a state where the main body the containing part are inclined at least two angles with respect to the support by the tilt forming part.

Advantageous Effects

As described above, the smart blender according to the present invention has the following effects.

According to the present invention, when the smart blender is slanted by an external force and the external force is removed, the smart blender blends the food contained therein while repeatedly shaking side to side, so that the food can be pulverized well.

Therefore, there is a convenience that the user is not required to continuously hold the smart blender and shake or hit.

In other words, according to the present invention, when the user tilts the smart blender once and releases the smart blender, the smart blender continues to shake like a roly-poly or a swing, so that the user does not need to keep holding the smart blender.

In addition, even when the smart blender is large in size, the smart blender can be easily and smoothly shaken while being held, so that the food is easily blended and pulverized.

According to the present invention, since the main body is rotated in the vertical direction about the hinge part, the food contained in the containing part can be uniformly blended and pulverized well.

Therefore, the user is not required to continuously hold the smart blender and shake or hit, so that the smart blender can provide convenience and the motor can be prevented from being damaged.

In addition, since contents such as food or the like are blended well and pulverized, it is not necessary to instantaneously rotate the motor at an extremely high speed, so that the lifetime of the motor can be increased and the electric charge can be reduced, which is economical.

In addition, when the coil spring is used as the driving part, the coil spring may serve as a buffer so that noise and vibration generated from the main body and transmitted to the floor is minimized.

According to the present invention, since the blender may be inclined by an external force, the food contained in the blender may be blended and pulverized well.

Therefore, there is the convenience that the user is not required to continuously hold the blender and shake or hit.

In addition, the blender may be conveniently used by inclining the blender automatically by the second motor, the measuring part and the control part.

DESCRIPTION OF THE INVENTION

BEST MODE

First Embodiment

Figure 1:
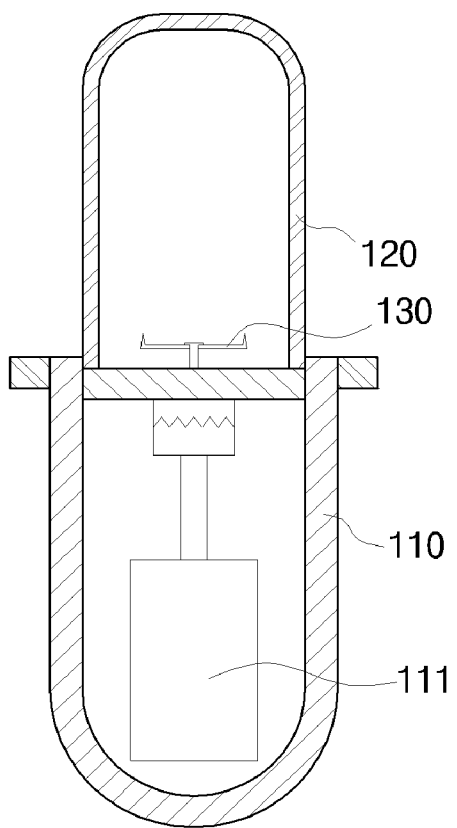
FIG. 1 is a sectional view illustrating the structure of a smart blender according to a first embodiment of the present invention.

FIG. 1 is a sectional view illustrating the structure of a smart blender according to a first embodiment of the present invention. FIGS. 2A to 2D are views illustrating a using state of a smart blender according to the first embodiment of the present invention.

A smart blender of the present invention pulverizes or blends food 150 contained therein by a rotating blade 130. When the smart blender is slanted by an external force and the external force is removed, the smart blender blends the food 150 contained therein while repeatedly shaking side to side.

To this end, a blender according to a first embodiment, a blender includes a main body 110, a containing part 120, and a blade 130.

A motor 111 is built in contained in the main body 111.

In this case, the motor 111 may be operated by an external power source or may be wirelessly operated by a built-in battery charged.

A lower surface of the main body 110, which is in contact with a bottom surface, is formed in a round shape.

The lower surface of the main body 110 may be formed in a round shape rounded in any one direction. Preferably, the lower surface may be formed in a shape of a dome protruding downward.

Thus, the main body 110 may be inclined in all directions with respect to the bottom surface.

The containing part 120 is coupled to an upper portion of the main body 110 and contains the food 150 therein.

It is sufficient that the containing part 120 is the same as that used in a conventional blender.

For example, the containing part 120 may include an upper cup member formed in a substantially inverse U shape as in the present embodiment, and a support member coupled to a lower portion of the upper cup member to close the lower portion of the upper cup member.

In addition, the support member is detachably coupled to an upper surface of the main body 110.

The blade 130 is installed to the main body 110 or the containing part 120 and rotated by the motor 111, thereby pulverizing and/or blending the food.

According to the present embodiment, the blade 130 is installed to the support member of the containing part 120.

The blade 130 is coupled to the motor 111 so that the blade 130 is rotated by the rotation of the motor 111.

In addition, according to the present invention, the center of gravity of the blender is located below a midpoint of an entire vertical length thereof. Preferably, the center of gravity of the blender is adjacent to the lower surface of the main body 110.

Thus, when the blender is tilted, the blender is repeatedly swung side to side by the center of gravity like a tumbler, and then, stands up by itself.

Hereinafter, the using state of the present invention configured as described above will be described.

Figure 2A:
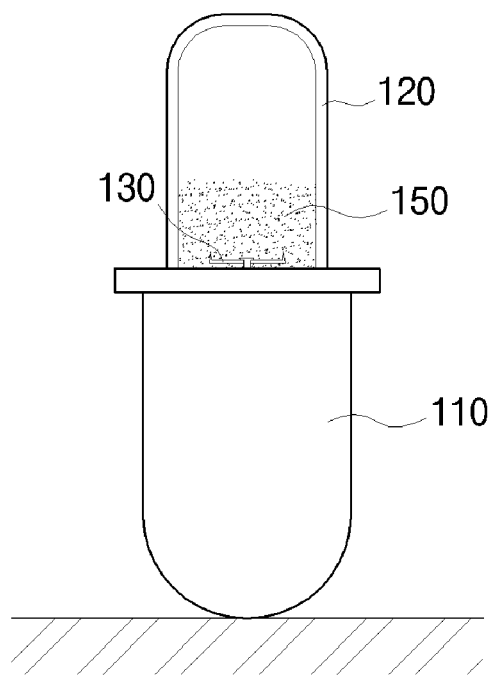
FIGS. 2A to 2D are views illustrating a using state of a smart blender according to the first embodiment of the present invention.

As illustrated in FIG. 2A, the food 150 is put into the containing part 120.

In this case, the blender stands up vertically.

Figure 2B:
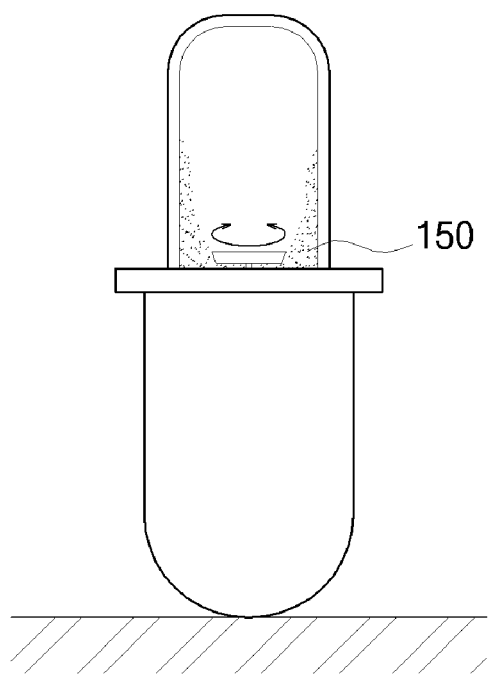

As illustrated in FIG. 2B, when the blade 130 is rotated by the operation of the motor 111, the food 150 is pushed toward the inner wall of the containing part 120 by a centrifugal force while being partially pulverized.

Thus, there exists a part of the food 150 that is not pulverized by the blade 130.

In this case, a user hits the blender in a horizontal direction.

Figure 2C:
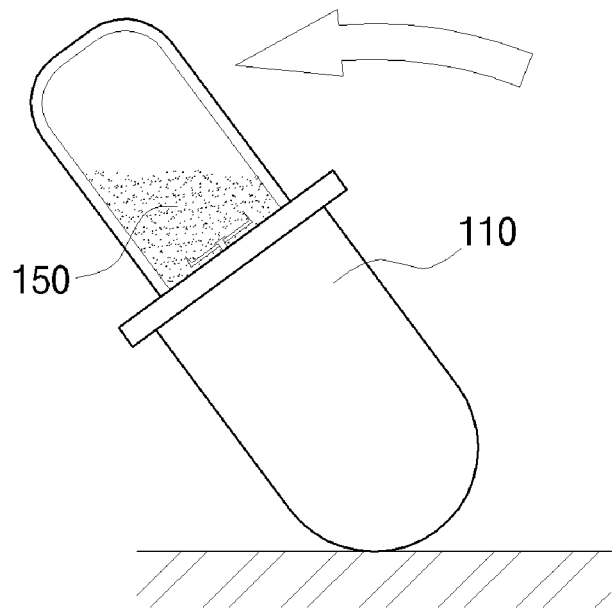

Then, as illustrated in FIG. 2C, the blender tilted in one direction by an external force tries to move again in the opposite direction where the center of gravity is present as the external force is removed.

Figure 2D:
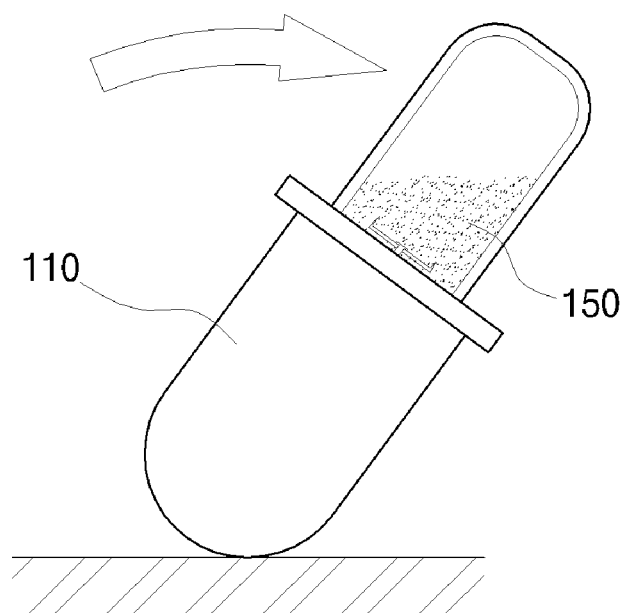

In this case, as illustrated in FIG. 2D, the blender is tilted in the opposite direction due to the inertial force acting in the opposite direction.

Therefore, as illustrated in FIGS. 2C and 2D, the blender is shaken like a roly-poly while repeating the tilting operation.

As a result, the food 150 pushed to the vicinity of the inner wall of the containing part 120 is moved toward the center, at which the blade 130 exists, by gravity as the containing part 120 is elongated.

As describe above, since the blender is tilted while being repeatedly shaken in the horizontal direction so that the food 150 moves toward the center at which the blade 130 exists, the food 150, which has not yet been pulverized, may be more efficiently pulverized by the blade 130.

In addition, according to the present invention, since the blender is automatically repeatedly tilted several times in the left and right direction when the user hits the blender once, there is no need to continue to vigorously shake or strike the blender in order to move the food 150 moved to the inner wall of the container part 120 to the center, at which the blade 130 exists, as in the related art.

The present invention is more effective when pulverizing low-moisture food 150.

Second Embodiment

Figure 3:
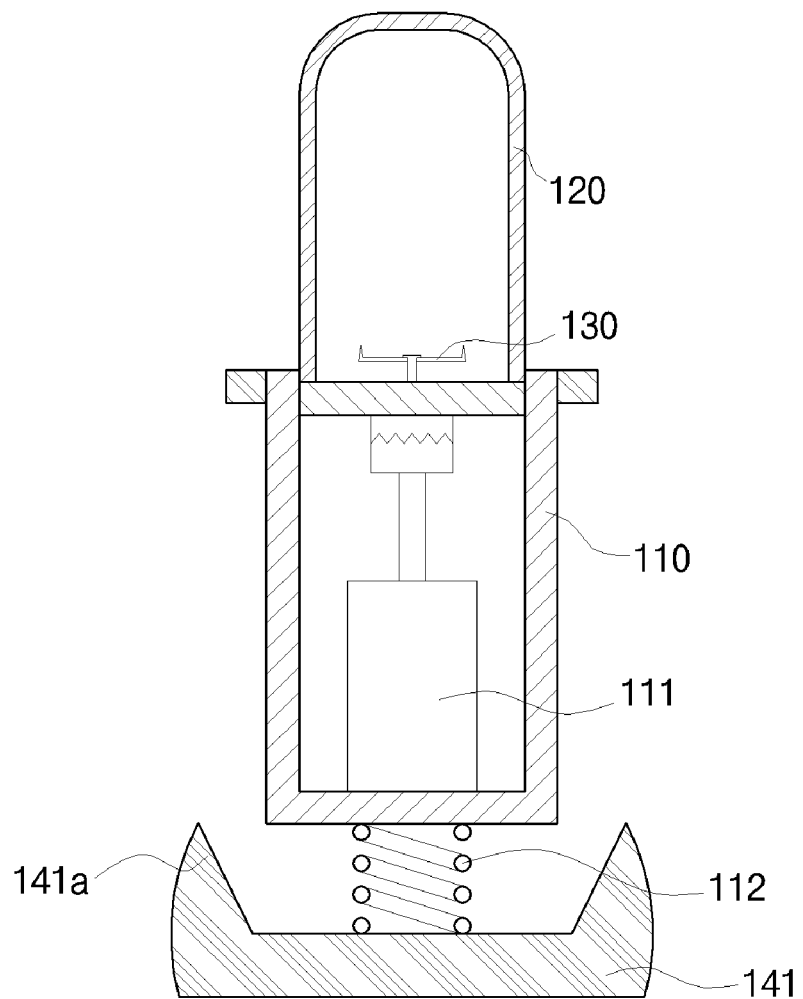
FIG. 3 is a sectional view of a smart blender according to a second embodiment of the present invention.

FIG. 3 is a sectional view of a smart blender according to a second embodiment of the present invention. FIGS. 4A to 4D are views illustrating a using state of a smart blender according to the second embodiment of the present invention.

A blender according to the second embodiment includes a main body 110, a containing part 120, a blade 130, a first support 141, and a connecting member 112.

Since the main body 110, the containing part 120, and the blade 130 are the same as those of the first embodiment, the details will be omitted.

According to the present embodiment, a lower surface of the main body 110 may be formed in a dome shape or in a flat shape as in the first embodiment.

The first support 141 is disposed on a lower portion of the main body 110.

That is, according to the second embodiment, the lower surface of the main body 110 is not in contact with the bottom surface but the lower surface of the first support 141 is in contact with the bottom surface.

In addition, a suction plate (not shown) is installed to the first support 141 to allow the first support 141 to be fixed to the bottom surface such that the first support 141 is prevented from being shaken.

In addition, a stopper 141a is formed on the first support 141 to limit the angle at which the main body 110 is shaken side to side.

Thus, when the main body 110 is shaken side to side, the main body 110 is in contact with the stopper 141a to prevent the main body 110 from shaking at an excessive angle.

The connecting member 112 connects the first support 141 and the main body 110 to each other.

The connecting member 112 allows the main body 110 to shake side to side with respect to the first support 141 by an external force.

As described above, as long as the main body 110 shakes side to side with respect to the first support 141, the connecting member 112 may be of any configuration.

Specifically, the connecting member 112 is formed of an elastic material such that the connecting member 112 is elastically deformed by the external force and elastically restored when the external force is removed. Preferably, the connecting member 112 has one end coupled to the first support 141 and an opposite end coupled to the main body 110.

Since the connecting member 112 is formed of an elastic material, the connecting member 112 is elastically deformed by the external force when the main body 110 is slanted by the external force and shakes side to side by the elastic restoring force of the elastic material when the external force is removed.

As described above, if the connecting member 112 is formed of a material having elasticity, the connecting member 112 maybe formed of a plate spring, a wire spring, or the like. As shown in drawings of the present embodiment, the connecting member 112 is formed of a coil spring arranged in the vertical direction.

One end of the connecting member 112 formed of the coil spring is coupled to an upper surface of the first support 141 and the opposite end is coupled to a lower surface of the main body 110, such that the main body 110 is supported to stand up with respect to the first support 141.

Specifically, the connecting member 112 is formed of a coil spring having elasticity so that the connecting member 112 may generate a strong vibration due to an inertial force when an external force is applied to the connecting member 112. Thus, the food or the like contained in the containing part 120 may be better mixed.

In addition, the connecting member 112 is elastically compressed by an external force pressing down the containing part 120.

The opposite end of the connecting member 112 may be coupled to a side surface of the main body 110. In this case, the connecting member 112 is elastically compressed by the external force pressing down the containing part 120 while being bent.

According to the present embodiment, the connecting member 112 is elastically compressed in the vertical direction by the external force pressing down the containing part 120.

Hereinafter, the using state of the present invention configured as described above will be described.

Figure 4A:
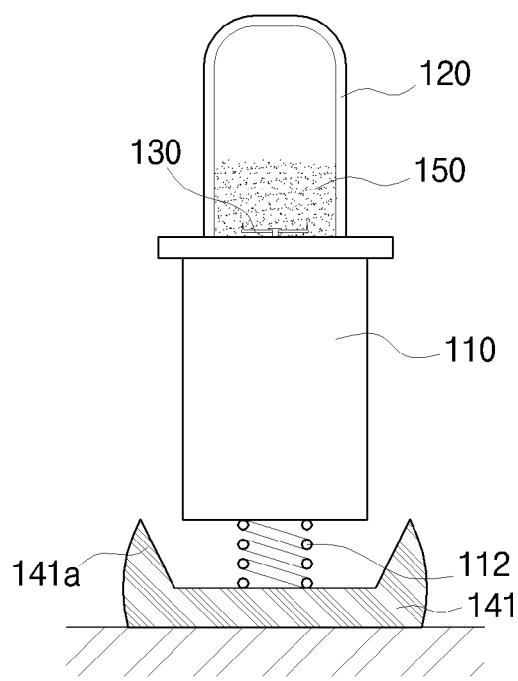
FIGS. 4A to 4D are views illustrating a using state of a smart blender according to the second embodiment of the present invention.

As illustrated in FIG. 4A, the food 150 is put into the containing part 120.

In this case, the blender stands up vertically by the supporting force of the connecting member 112.

Figure 4B:
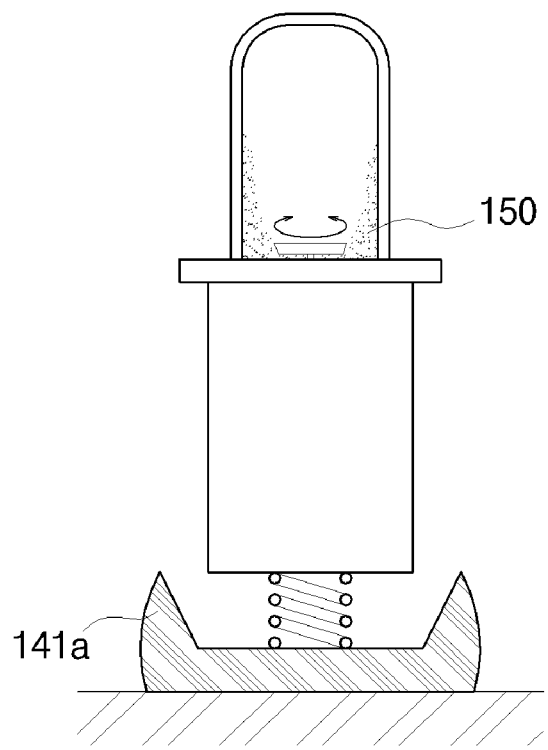

As illustrated in FIG. 4B, when the blade 130 is rotated by the operation of the motor 111, the food 150 is pushed toward the inner wall of the containing part 120 by a centrifugal force while being partially pulverized.

Thus, there exists a part of the food 150 that is not pulverized by the blade 130.

In this case, a user hits the main body 110 and the containing part 120 lightly in a horizontal direction.

Figure 4C:
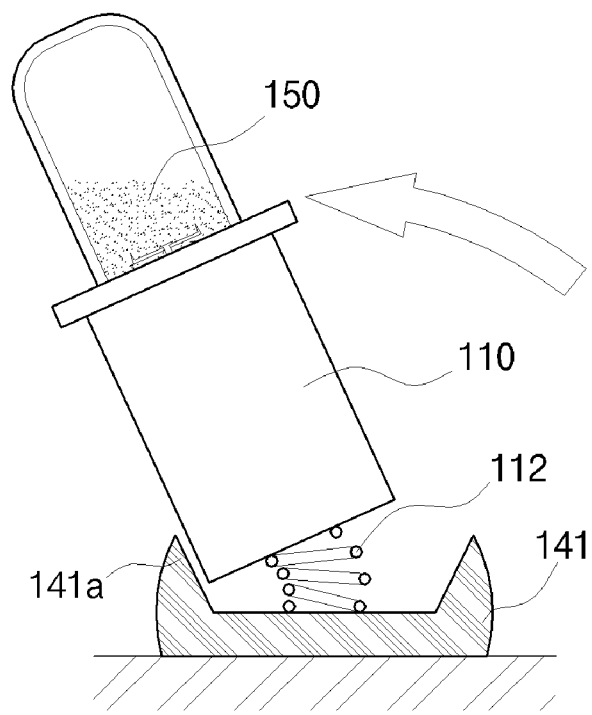

Then, as illustrated FIG. 4C, the main body 110 and the connecting member 112 are tilted in one direction by the external force.

Figure 4D:
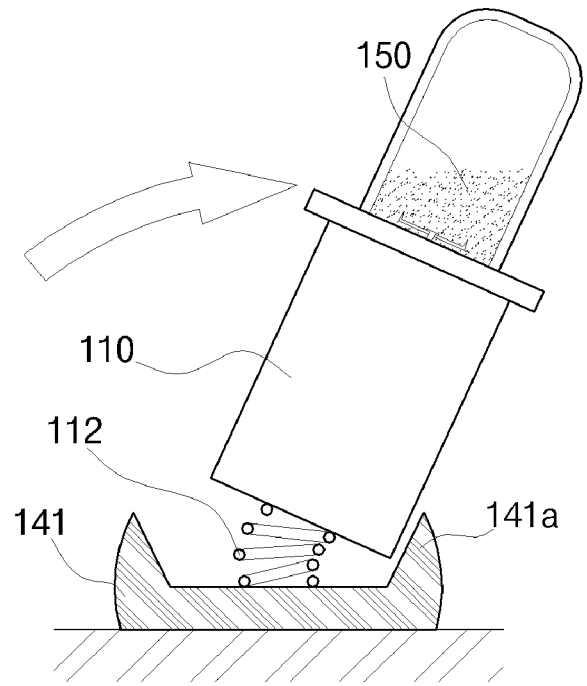

As the external force applied to the main body 110 is removed, the main body 110 and the connecting member 112 are tilted in the opposite direction by the elastic restoring force of the connecting member 112 as illustrated in FIG. 4D.

In this case, since the first support 141 is fixed to the bottom surface by the suction plate or the like, the first support 141 is kept stationary without being shaken when the main body 110 moves.

In addition, the main body 110 is shaken side to side only within a certain angle by the stopper 141a, so that the main body 110 is laid down at an unreasonable angle to prevent the connecting member 112 from being damaged by the user.

As described above, the main body 110 and the containing part 120 are shaken like a roly-poly while repeating the tilting operation as illustrated in FIGS. 4C and 4D.

As a result, the food 150 pushed to the vicinity of the inner wall of the containing part 120 is moved toward the center, at which the blade 130 exists, by gravity as the containing part 120 is elongated.

As describe above, since the blender is tilted while being repeatedly shaken in the horizontal direction so that the food 150 moves toward the center at which the blade 130 exists, the food 150, which has not yet been pulverized, may be more efficiently pulverized by the blade 130.

Specifically, since the connecting member 112 is formed of a plate spring, a coil spring, or the like, the food may be separated from the inner wall of the containing part 120 while the contain part 120 is moved strongly and rapidly in the left and right direction.

In addition, according to the present invention, since the blender is automatically repeatedly tilted several times in the left and right direction when the user hits the blender once, there is no need to continue to vigorously shake or strike the blender in order to move the food 150 moved to the inner wall of the container part 120 to the center, at which the blade 130 exists, as in the related art.

Meanwhile, according to the present embodiment, since the connecting member 112 is formed of a coil spring and is elastically compressed by the external force pressing down the containing part 120, when the user hits the containing part 120 downward, the containing part 120 moves or evenly mixes the food 150 contained in the containing part 120 while being shaken in the vertical direction by the elastic force of the connecting member 112.

Since other details are the same as or similar to those of the first embodiment, the detailed descriptions will be omitted.

Third Embodiment

Figure 5A:
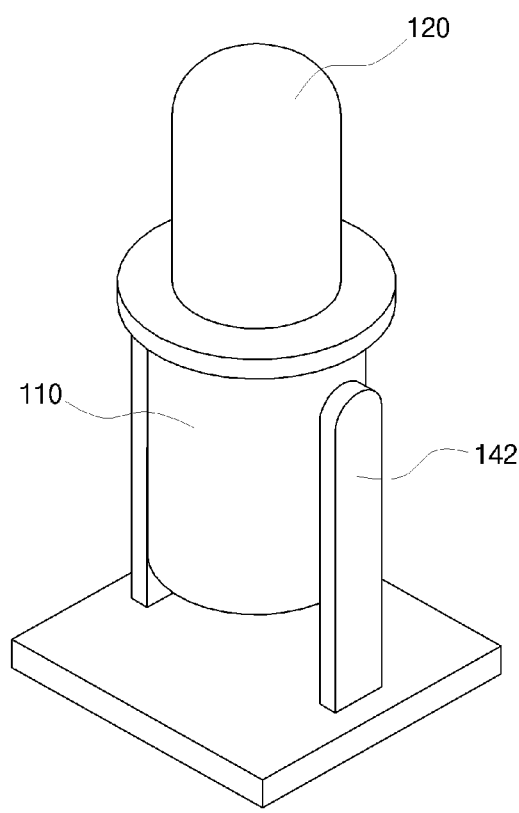
FIGS. 5A and 5B are a perspective view and a sectional view of a smart blender according to a third embodiment of the present invention.
Figure 5B:
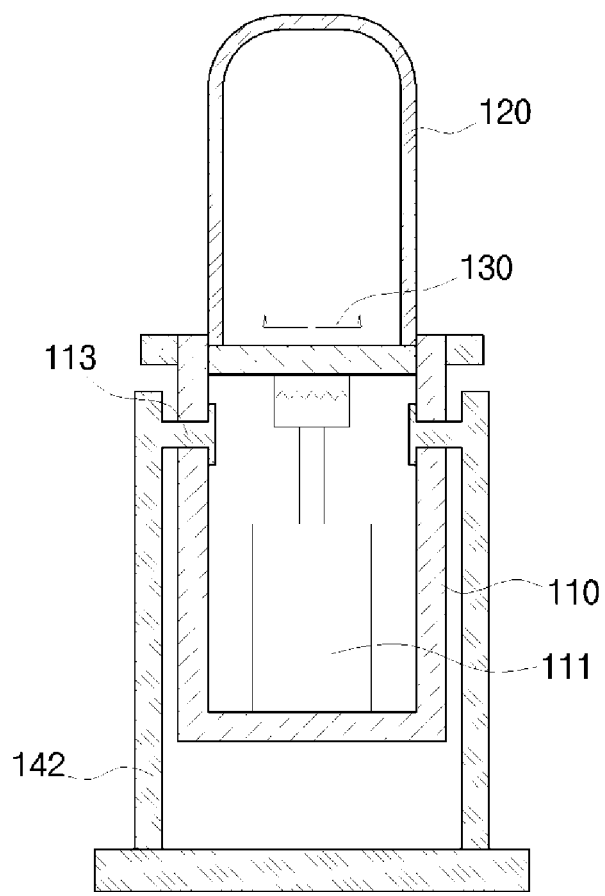

FIGS. 5A and 5B are a perspective view and a sectional view of a smart blender according to a third embodiment of the present invention. FIGS. 6A to 6D are views illustrating a using state of a smart blender according to the third embodiment of the present invention.

A blender according to the third embodiment includes a main body 110, a containing part 120, a blade 130, a second support 142, and a rotation shaft 113.

Since the main body 110, the containing part 120, and the blade 130 are the same as those of the first embodiment, the details will be omitted.

According to the present embodiment, a lower surface of the main body 110 may be formed in a dome shape or in a flat shape as in the first embodiment.

The second support 142 is disposed in a lateral direction, that is, on both sides of the main body 110.

According to the present embodiment, the second support 142 is disposed on a lower portion of the main body 110 as well as both sides of the main body 110.

In addition, a suction plate (not shown) is installed to the second support 142 to allow the second support 142 to be fixed to the bottom surface such that the second support 142 is prevented from being shaken.

The rotation shaft 113 rotatably connects the main body 110 or the containing part 120 to the second support 142.

In this case, the rotation shaft 113 is positioned above the center of gravity in a state where the main body 110 and the receiving portion 120 are combined with each other.

Thus, the main body 110 and the containing part 120 are repeatedly swung side from left to right with respect to the rotating shaft 113 by an external force like a swing.

Hereinafter, the using state of the present invention configured as described above will be described.

Figure 6A:
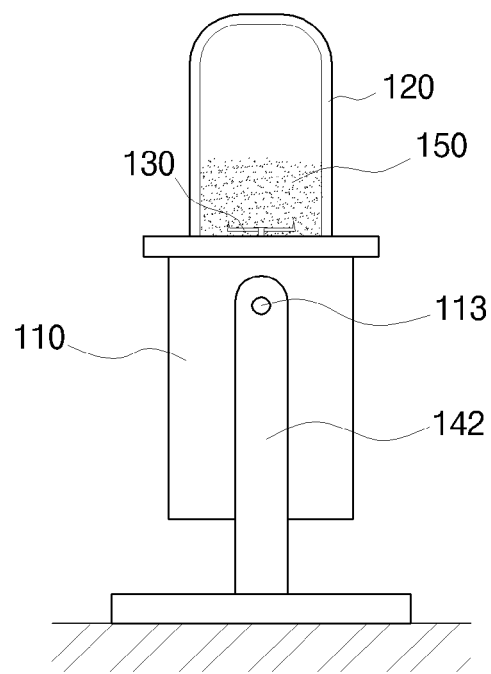
FIGS. 6A to 6D are views illustrating a using state of a smart blender according to the third embodiment of the present invention.

As illustrated in FIG. 6A, the food 150 is put into the containing part 120 and the containing part 120 is coupled to the main body 110.

Although the rotation shaft 113 is coupled to the main body 110 as illustrated in the drawings of the present embodiment, the rotation shaft 113 may be coupled to the containing part 120.

Figure 6B:
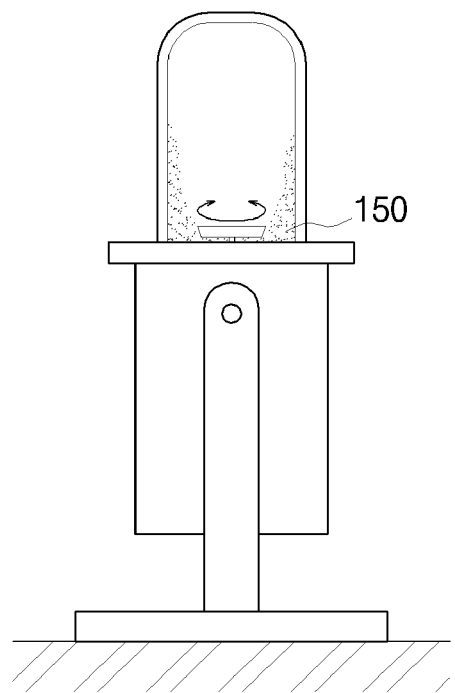

As illustrated in FIG. 6B, when the blade 130 is rotated by the operation of the motor 111, the food 150 is pushed toward the inner wall of the containing part 120 by a centrifugal force while being partially pulverized.

Thus, there exists a part of the food 150 that is not pulverized by the blade 130.

In this case, a user hits the main body 110 and the containing part 120 lightly in a horizontal direction.

Figure 6C:
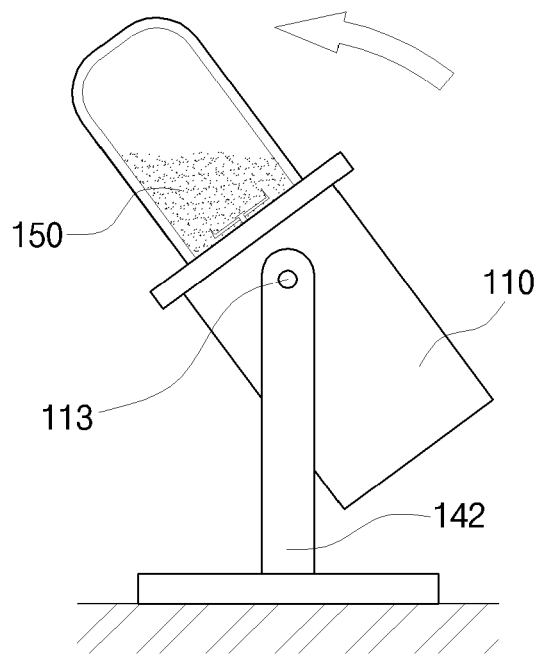
Figure 6D:
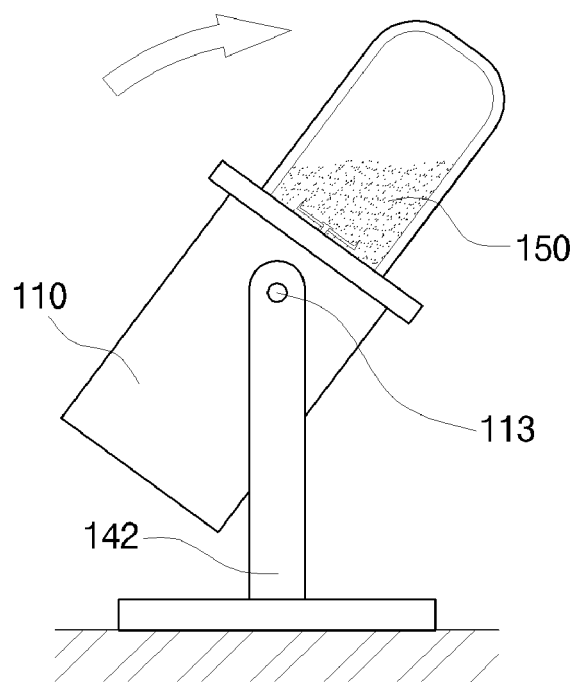

Then, as illustrated FIGS. 6C and 6D, the main body 110 and the containing part 120 repeatedly performs a turning movement in the one direction and the opposite direction about the rotation shaft 113 by an external force.

As a result, the food 150 pushed to the vicinity of the inner wall of the containing part 120 is moved toward the center, at which the blade 130 exists, by gravity as the containing part 120 is elongated.

As describe above, since the blender is tilted while being repeatedly shaken in the horizontal direction so that the food 150 moves toward the center at which the blade 130 exists, the food 150, which has not yet been pulverized, may be more efficiently pulverized by the blade 130.

In addition, according to the present invention, since the blender is automatically repeatedly tilted several times in the left and right direction when the user hits the blender once, there is no need to continue to vigorously shake or strike the blender in order to move the food 150 moved to the inner wall of the container part 120 to the center, at which the blade 130 exists, as in the related art.

Since other details are the same as or similar to those of the first embodiment, the detailed descriptions will be omitted.

Fourth Embodiment

Figure 7:
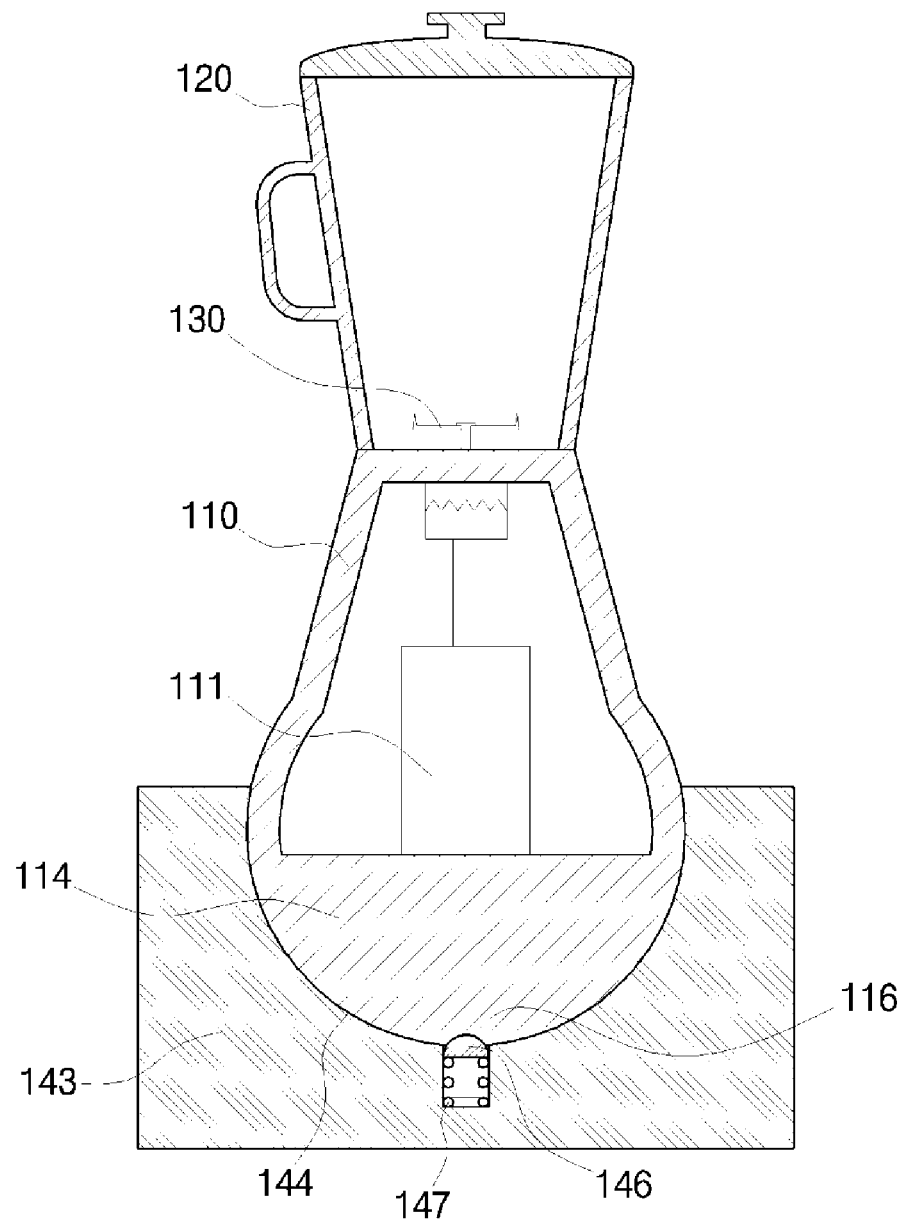
FIG. 7 is a sectional view illustrating the structure of a smart blender according to a fourth embodiment of the present invention.

FIG. 7 is a sectional view illustrating the structure of a smart blender according to a fourth embodiment of the present invention. FIGS. 8A to 8D are views illustrating a using state of a smart blender according to the third embodiment of the present invention.

Preferably, differently from the first to third embodiments, the blender according to the fourth embodiment is used when the size is large.

A blender according to the fourth embodiment includes a main body 110, a containing part 120, a blade 130, and a third support 143.

Since the containing part 120 and the blade 130 are the same as those of the first embodiment, the details will be omitted.

The third support 143 is coupled to a lower portion of the main body 110.

In addition, the lower portion of the main body 110 is coupled such that the lower portion of the main body 110 is tilted with respect to the third support 143 by an external force.

In more detail, the lower portion of the main body 110 is ball joint coupled to the third support 143.

According to the present embodiment, an insertion protrusion 114 having a dome shape is formed on the lower portion of the main body 110, and an insertion groove 144 is formed on an upper portion of the third support 143, which is rotated while the insertion protrusion 114 is inserted thereinto.

Thus, the main body 110 may be tilted with respect to the third support 143 while being supported by the third support 143.

Meanwhile, the insertion protrusion 114 is formed with a fixing groove 116, and the third support is formed with a fixing protrusion 146 inserted into the fixing groove 116.

According to the present embodiment, the fixing protrusion 146 is elastically supported by a fixed pressing spring 147.

As a result, the fixing protrusion 146 is inserted into the fixing groove 116 to allow the main body 110 to be maintained in the state.

In FIG. 7, the fixing groove 116 is formed in a central lower portion of the insertion protrusion 114, such that the main body stands up vertically when the fixing protrusion 146 is inserted into the fixing groove 116.

Accordingly, a user easily puts food or the like into the containing part 120.

Hereinafter, the using state of the present invention configured as described above will be described.

Figure 8A:
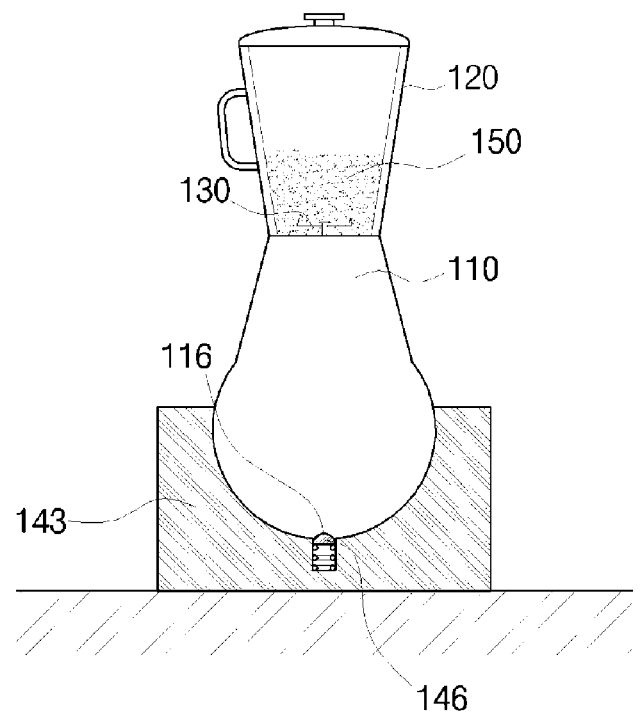
FIGS. 8A to 8D are views illustrating a using state of a smart blender according to the third embodiment of the present invention.

As illustrated in FIG. 8A, in a state where the main body 110 and the containing part 120 stand up vertically by the fixing groove 116 and the fixing protrusion 146, the food 150 is put into the containing part 120 and the containing part 120 is coupled to the main body 110.

Alternatively, in the state where the containing part 120 is coupled to the main body 110, an upper portion of the containing part 120 is opened to put the food 150 into the containing part 120.

Figure 8B:
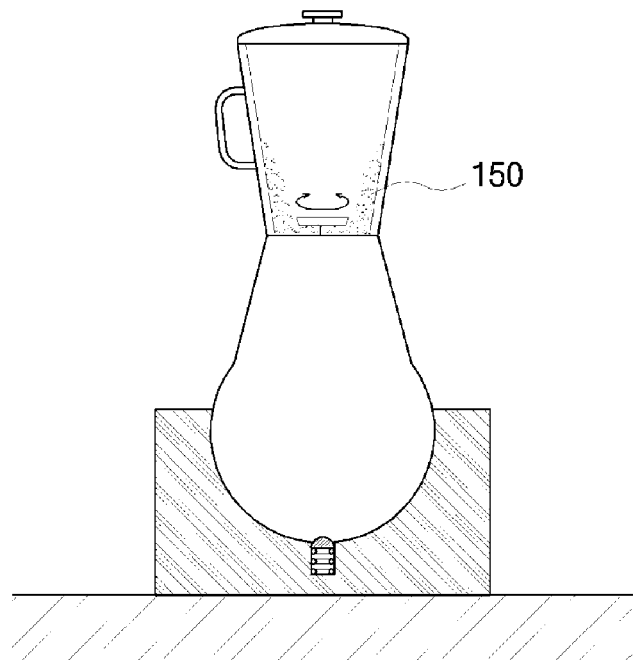

As illustrated in FIG. 8B, when the blade 130 is rotated by the operation of the motor 111, the food 150 is pushed toward the inner wall of the containing part 120 by a centrifugal force while being partially pulverized.

Thus, there exists a part of the food 150 that is not pulverized by the blade 130.

Figure 8C:
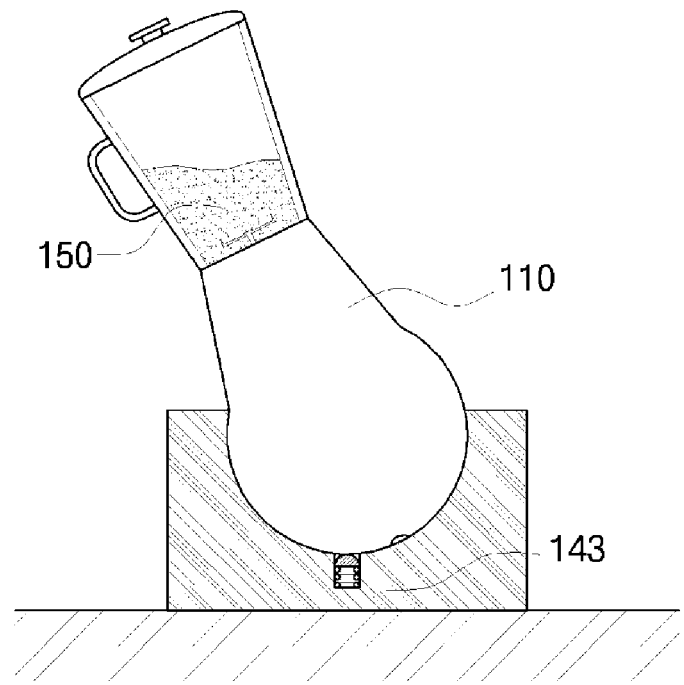
Figure 8D:
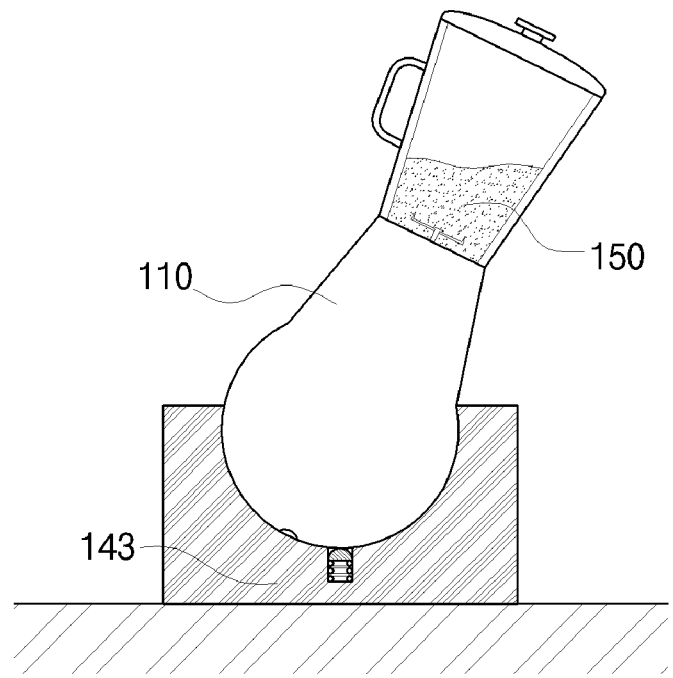

In this case, as illustrated in FIGS. 8C and 8D, the user repeatedly moves the containing part 120 and the main body 110 in the horizontal direction to tilt the containing part 120 and the main body 110 while holding the containing part 120 and the main body 110.

As a result, the food 150 pushed to the vicinity of the inner wall of the containing part 120 is moved toward the center, at which the blade 130 exists, by gravity as the containing part 120 is elongated.

Unlike the first to third embodiments, in the fourth embodiment, the main body 110 and the containing part 120 are not automatically shaken but are inclined only when the user continuously moves the containing part 120 and the main body 110 because the blender is large.

As describe above, since the blender is tilted while being repeatedly shaken in the horizontal direction so that the food 150 moves toward the center at which the blade 130 exists, the food 150, which has not yet been pulverized, may be more efficiently pulverized by the blade 130.

Since other details are the same as or similar to those of the first embodiment, the detailed descriptions will be omitted.

Fifth Embodiment

Figure 9:
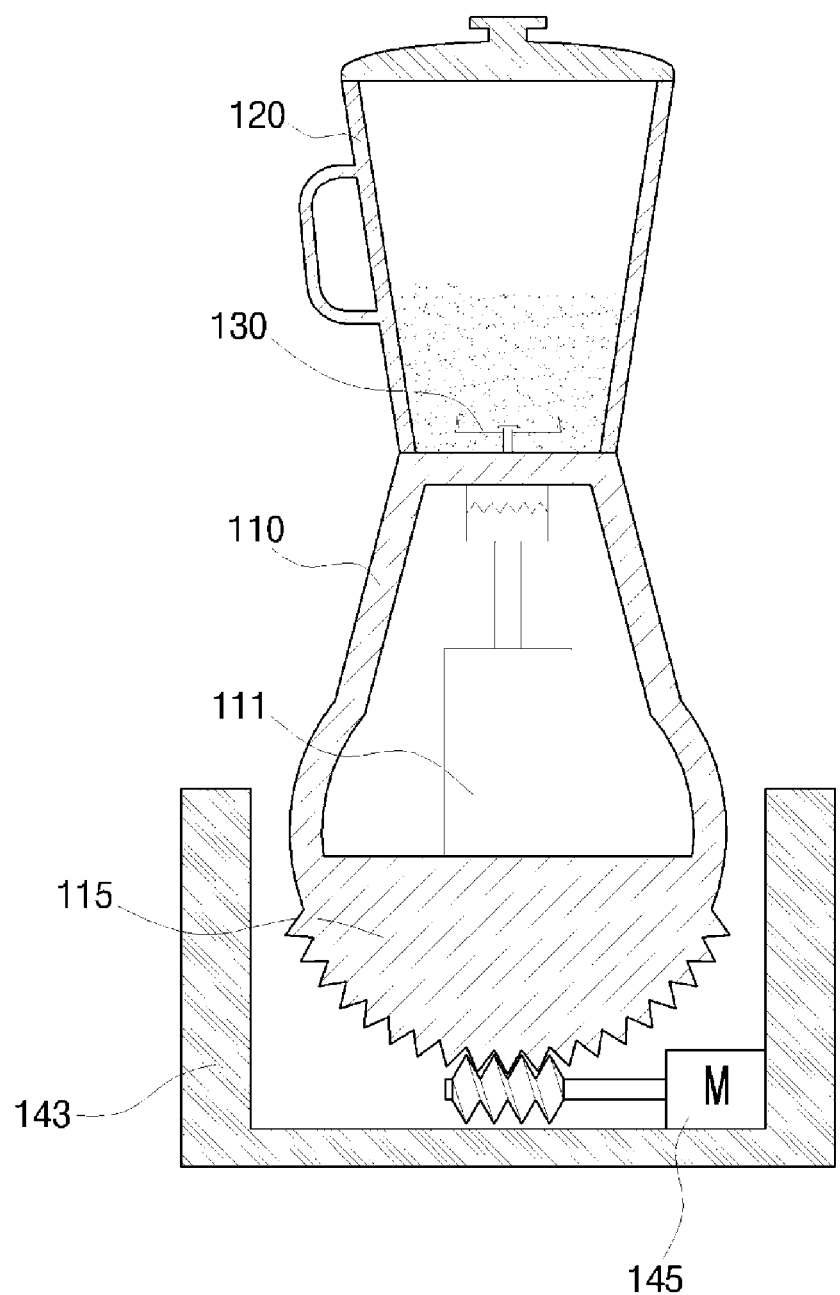
FIG. 9 is a sectional view illustrating the structure of a smart blender according to a fifth embodiment of the present invention.

FIG. 9 is a sectional view illustrating the structure of a smart blender according to a fifth embodiment of the present invention.

A blender according to the fifth embodiment includes a main body 110, a containing part 120, a blade 130, a third support 143, and a driving motor 145.

A lower portion of the main body 110 is formed in a dome shape and is formed with a rotation protrusion 115 having a gear.

The driving motor 145 gear-engaged with the rotation protrusion 115 is installed on the third support 143.

The rotation protrusion 115 and the driving motor 145 may be coupled to each other in various gear structures such as a worm gear coupling structure, a spur gear coupling structure, or the like.

Due to such a structure, when the driving motor 145 is operated, the main body 110 is inclined with respect to the third support 143 by the rotation protrusion 115 gear-engaged with the driving motor 145.

As described above, the main body 110 and the containing part 120 are shaken side to side by the forward and reverse rotation of the driving motor 145, so that the food contained in the containing part 120 may be pulverized while being effectively blended.

Since other details are the same as or similar to those of the fourth embodiment, the detailed descriptions will be omitted.

Sixth Embodiment

Figure 10:
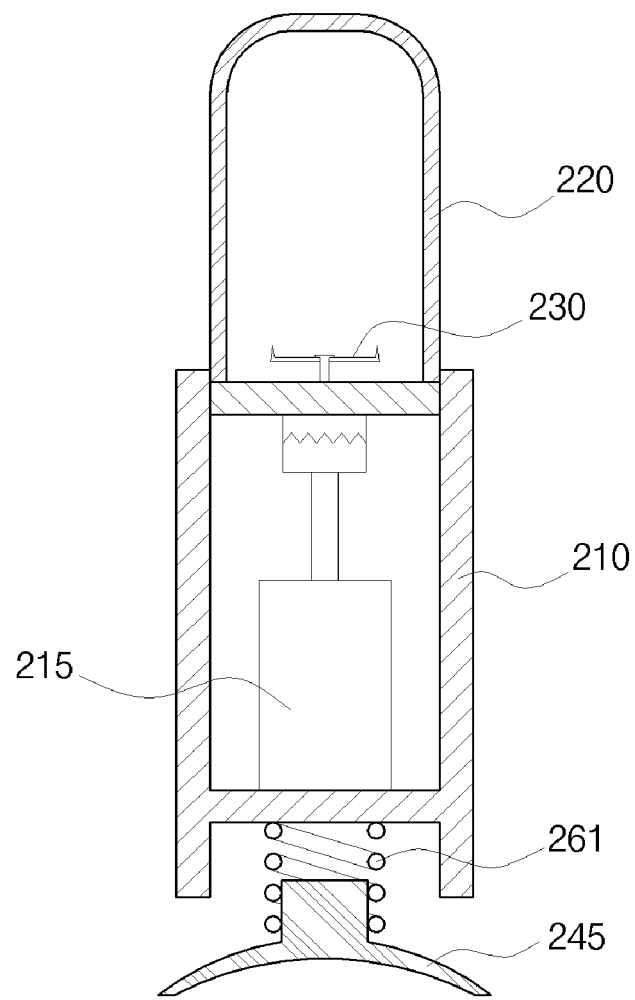
FIG. 10 is a sectional view illustrating the structure of a smart blender according to a sixth embodiment of the present invention.
Figure 11A:
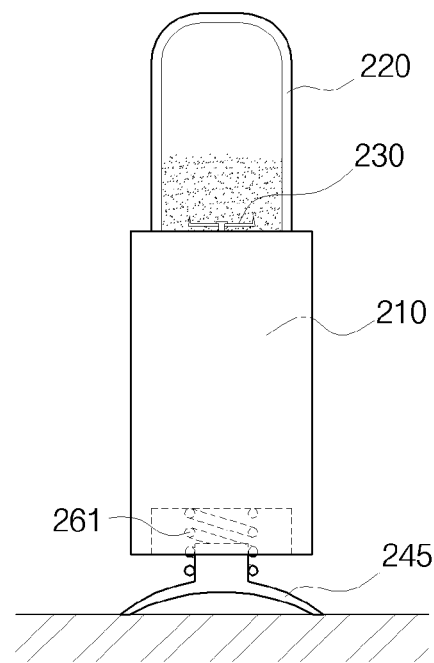
FIGS. 11A to 11D are views illustrating a process of operating a smart blender according to the sixth embodiment of the present invention.
Figure 11B:
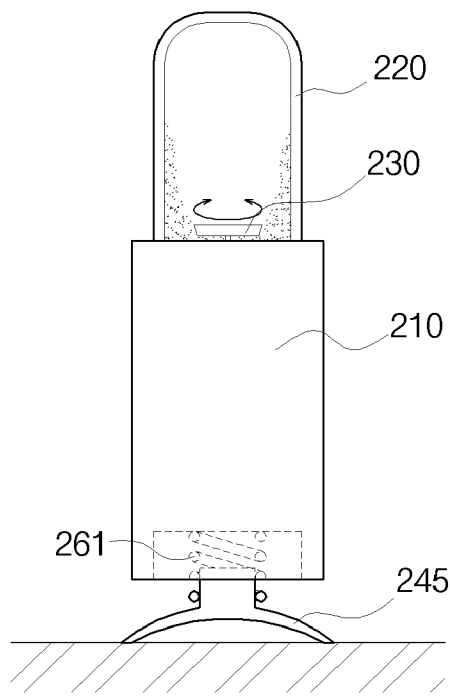
Figure 11C:
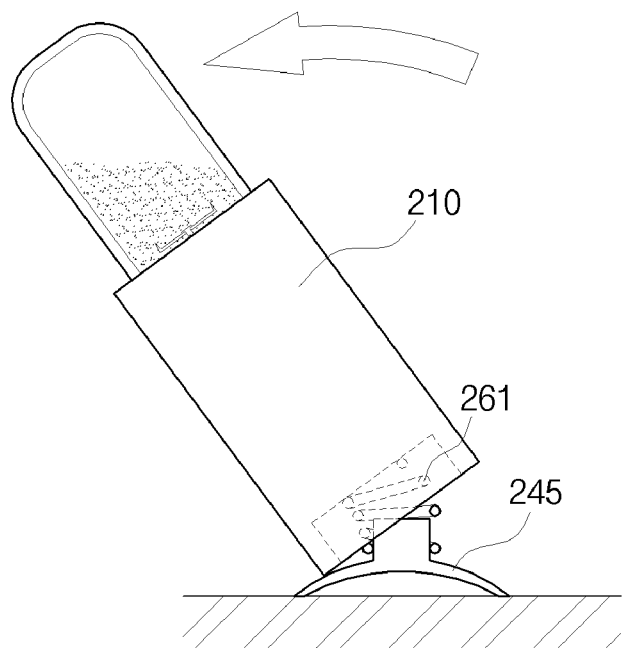
Figure 11D:
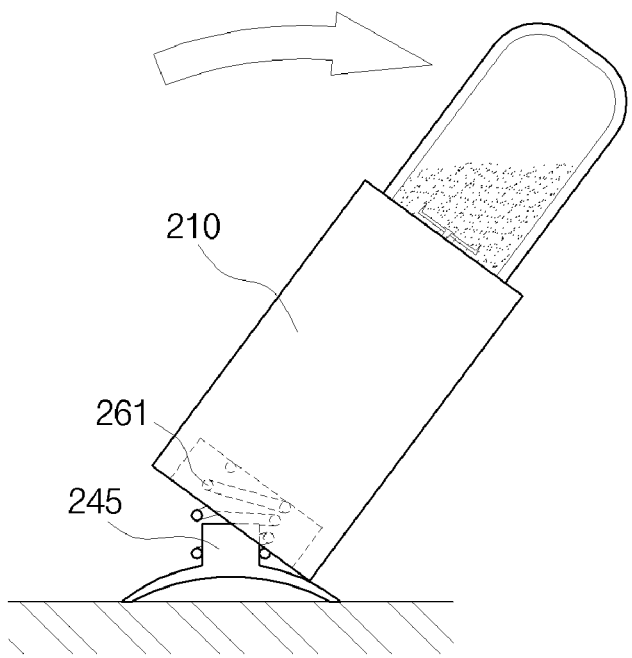
Figure 12:
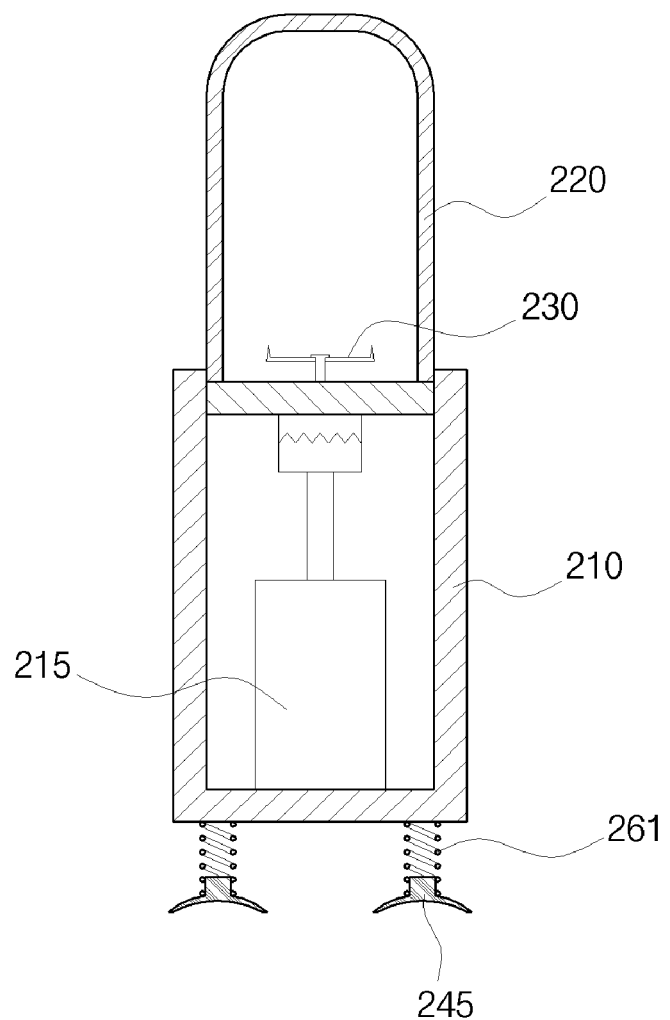
FIG. 12 is a sectional view illustrating a modified structure of the smart blender according to the sixth embodiment of the present invention.

FIG. 10 is a sectional view illustrating the structure of a smart blender according to a sixth embodiment of the present invention. FIGS. 11A to 11D are views illustrating a process of operating a smart blender according to the sixth embodiment of the present invention. FIG. 12 is a sectional view illustrating a modified structure of the smart blender according to the sixth embodiment of the present invention.

As shown in FIGS. 10 and 11A to 11D, a smart blender according to the present invention, which pulverizes or blends food contained therein by a rotating blade, includes a main body 210, a containing part 220, a blade 230, a base part, and a driving part.

A motor 215 is contained in the main body 210, and is operated by an inner power source such as a battery or the like or an external power source.

The containing part 220 is detachably coupled to the main body 210 and contains contents such as food or the like therein.

It is sufficient that the containing part 220 is the same as that used in a conventional blender.

For example, the containing part 220 may include an upper cup member formed in a substantially inverse U shape as in the present embodiment, and a support member coupled to a lower portion of the upper cup member to close the lower portion of the upper cup member.

In addition, the support member is detachably coupled to an upper surface of the main body 210.

According to the present embodiment, the containing part 220 is detachably coupled to an upper portion of the main body 210.

The blade 230 is installed to the main body 210 or the containing part 220 and rotated by the motor 215, thereby pulverizing and/or blending the food.

According to the present embodiment, the blade 230 is installed to the support member of the containing part 220.

The blade 230 is coupled to the motor 215 so that the blade 130 is rotated by the rotation of the motor 215.

The base part includes a suction plate 245 of rubber or the like and disposed on a lower portion of the main body 210 to support the main body 210 with respect to the ground.

Unlike the present embodiment, the base part may be made of a general plastic or metal and may support the main body 210 with respect to the ground.

In this case, a separate suction member made of rubber or the like is mounted on the lower surface of the base part so that the base part is fixed not to be shaken when the blender is operated.

However, according to the present embodiment, preferably, the base part includes the suction plate 245 and is tightly fixed to the bottom surface.

In this case, the base part may include only one suction plate 245 of a large size as shown in FIGS. 10 and 11A to 11D. Alternatively, as shown in FIG. 12, the base part may include a plurality of suction plates 245 as shown in FIG. 12.

The driving part is disposed between the suction plate 245 and the main body 210 and supports the main body 210 in the vertical direction with respect to the suction plate 245.

In the present embodiment, the driving part is made of an elastic material elastically deformed by an external force and elastically restored when the external force is removed, and has one end coupled to the suction plate 245 and an opposite end coupled to the main body 210.

In more detail, according to the present embodiment, the driving part includes a coil spring 261, and has a lower end coupled to an upper surface of the suction plate 245 and an upper end coupled to a lower surface of the main body 210.

Thus, the coil spring 261 supports the main body 210 in the vertical and/or horizontal direction with respect to the base part, that is, the suction plate 245.

As described above, the coil spring 261 is coupled and connected to the base part including the suction plate 245 and the main body 210, so that the main body 210 may repeatedly move in the vertical and/or horizontal direction to better blend and pulverize the food contained in the containing part 220.

Hereinafter, an operating method of the present invention configured as described above will be described in detail.

As illustrated in FIG. 12A, the food is put into the containing part 220 and the containing part 220 is coupled to the main body 210.

The suction plate 245 is adsorbed on the bottom surface to fix the main body 210.

As illustrated in FIG. 12B, when the blade 230 is rotated by the operation of the motor 215, the food is pushed toward the inner wall of the containing part 220 by the centrifugal force while being partially pulverized.

Thus, there exists a part of the food that is not pulverized by the blade 230.

In this case, a user shakes the main body 110 or the containing part 120 or lightly hits the main body 110 or the containing part 120 in the horizontal direction.

Then, as shown in FIG. 12C, the main body 210 and the coil spring 261 are inclined in one direction by an external force.

As the external force applied to the main body 210 is removed, the main body 210 and the coil spring 261 are tilted in the opposite direction by the elastic restoring force of the coil spring 261 as illustrated in FIG. 12D.

In this case, since the base part 240 is fixed to the bottom surface by the suction plate 245, the base part 240 is kept stationary without being shaken when the main body 210 moves.

As described above, the main body 210 and the containing part 220 are shaken like a roly-poly while repeating the tilting operation as illustrated in FIGS. 12C and 12D.

As a result, the food pushed to the vicinity of the inner wall of the containing part 220 is moved toward the center, at which the blade 230 exists, by gravity as the containing part 220 is elongated.

As describe above, since the blender is tilted while being repeatedly shaken in the left and right direction so that the food moves toward the center at which the blade 230 exists, the food, which has not yet been pulverized, may be more efficiently pulverized by the blade 230.

Specifically, since the driving part include the coil spring 261, the food may be separated from the inner wall of the containing part 220 while the contain part 220 is moved strongly and rapidly in the left and right direction.

In addition, according to the present invention, since the blender is automatically repeatedly tilted several times in the left and right direction when the user hits the blender once, there is no need to continue to vigorously shake or strike the blender in order to move the food moved to the inner wall of the container part 120 to the center, at which the blade 230 exists, as in the related art.

In addition, according to the present embodiment, since the driving part is formed of the coil spring 261 and is elastically compressed by the external force pressing down the containing part 220, when the user hits the containing part 220 downward, the containing part 220 moves or evenly mixes the food contained in the containing part 220 while being shaken in the vertical direction by the elastic force of the coil spring 261.

As described above, the user is not required to continuously hold the entire blender and shake or hit strongly, so that the blender may provide convenience and the motor 215 may be prevented from being damaged.

In addition, since the food is blended well and pulverized, it is not necessary to instantaneously rotate the motor 215 at an extremely high speed, so that the lifetime of the motor 215 may be increased and the electric charge may be reduced, which is economical.

In addition, although noise and vibration are generated from the main body 210 due to the operation of the motor 215, since the coil spring 261 is coupled to the lower portion of the main body 210, the coil spring 261 may act as a buffer to attenuate the noise and vibration generated from the main body 210, so that the noise and vibration transmitted to the bottom surface is minimized.

Seventh Embodiment

Figure 13:
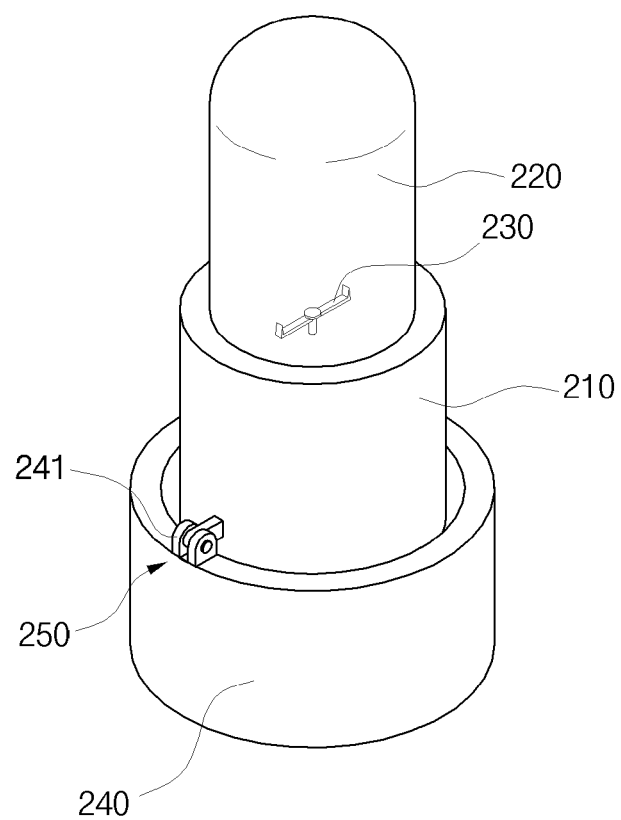
FIG. 13 is a perspective view of a smart blender according to a seventh embodiment of the present invention.
Figure 14:
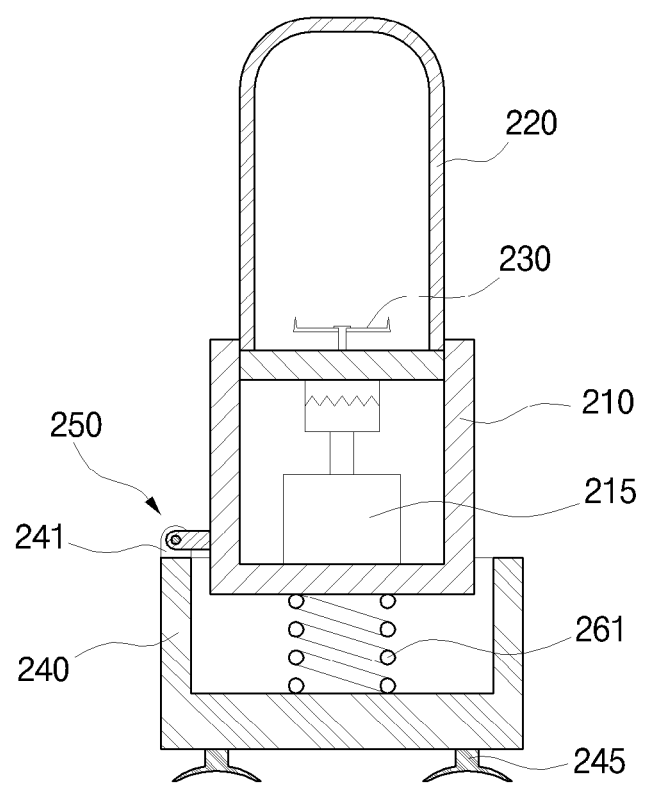
FIG. 14 is a sectional view illustrating the structure of the smart blender according to the seventh embodiment of the present invention.

FIG. 13 is a perspective view of a smart blender according to a seventh embodiment of the present invention. FIG. 14 is a sectional view illustrating the structure of the smart blender according to the seventh embodiment of the present invention. FIGS. 15A to 15D are views illustrating a process of operating the smart blender according to the seventh embodiment of the present invention.

As shown in FIGS. 13, 14 and 15A to 15D, a smart blender according to the seventh embodiment includes a main body 210, a containing part 220, a blade 230, a base part 240, a hinge part 250, and a driving part.

When the seventh embodiment is compared with the sixth embodiment, the base part 240, the hinge part 250 and the driving part of the seventh embodiment are different from those of the sixth embodiment. Thus, the description will be focused on them.

The base part 240 supports the main body 210 with respect to the ground.

A support 241 protrudes upwardly from the base part 240.

In addition a suction plate 245 made of rubber or the like is coupled to a lower surface of the base part 240 so that the base part 240 is prevented from moving when the blender is operated.

The hinge part 250 hinge-couples the main body 210 and the base part 240 such that the main body 210 is rotatable in the vertical direction with respect to the base 240.

In detail, the hinge part 250 hinge-couples the support 241 formed on the base part 240 and the main body 210 such that the main body 210 is rotatable.

The main body 210 may be rotated in the vertical direction with respect to the base part 240 in an arc locus by the hinge part 250.

In this case, the hinge part 250 preferably allows one side of a lower portion of the main body 210 to be hinge coupled to the support 241, such that the main body 210 may be rotated in a large arc locus.

In some cases, the center of the lower portion of the main body 210 may be hinge coupled to the support 241 through the hinge part 250.

As for the specific structure of the hinge part 250, it is sufficient to apply a conventionally known general hinge coupling structure, and thus, the detailed description will be omitted.

Since the main body 210 is hinge coupled to the base part 240 as described above, the main body 210 may be rotated in the vertical direction about the hinge part 250 in an arc locus, so that the food contained in the containing part 220 is better blended and pulverized.

The driving part is disposed between the base part 240 and the main body 210, so that the main body 210 is supported to move in the vertical direction with respect to the base part 240 about the hinge part 250.

According to the present embodiment, the driving part includes a coil spring 261.

One end of the coil spring 261 is coupled to the base part 240 and an opposite end is coupled to the main body 210.

If necessary, the driving unit may be formed of other springs, such as a plate spring or a torsion spring, instead of the coil spring The coil spring 261 is disposed long in the vertical direction, where a lower end of the coil spring 261 is coupled to an upper surface of the base part 240 and an upper end of the coil spring 261 is coupled to a lower surface of the main body 210.

As described above, when the user presses or pulls the main body 210, the main body 210 is repeatedly rotated in the vertical direction about the hinge part 250 in an arc locus by the elastic restoring force of the coil spring 261 due to the external force.

Hereinafter, an operating process of the present invention configured as described above will be described in detail.

As illustrated in FIG. 12A, the food is put into the containing part 220 and the containing part 220 is coupled to the main body 210.

In this case, the base part 240 is fixed to the bottom surface by the suction plate 245.

Figure 15A:
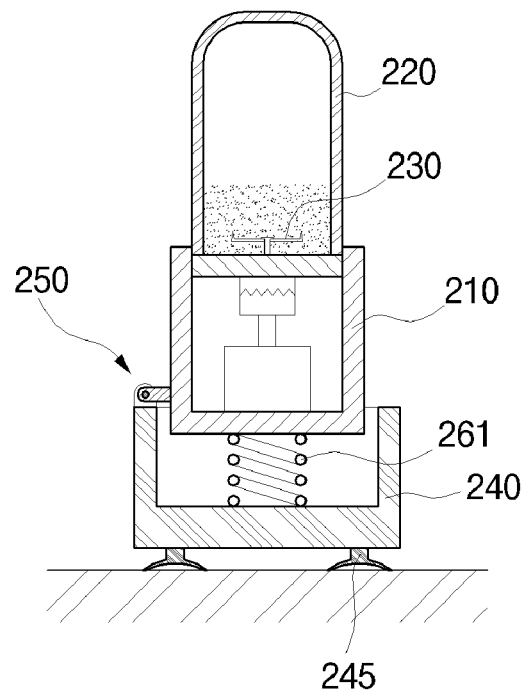
FIGS. 15A to 15D are views illustrating a process of operating the smart blender according to the seventh embodiment of the present invention.
Figure 15B:
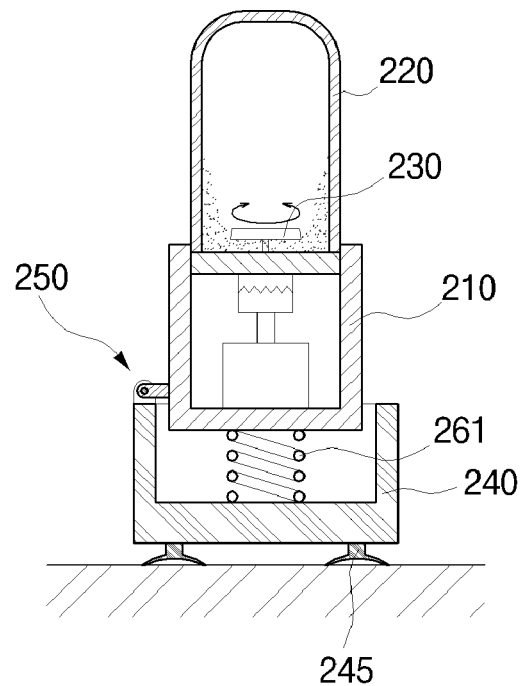

As illustrated in FIG. 15B, when the blade 230 is rotated by the operation of the motor 215, the food is pushed toward the inner wall of the containing part 220 by the centrifugal force while being partially pulverized.

Thus, there exists a part of the food that is not pulverized by the blade 230.

Figure 15C:
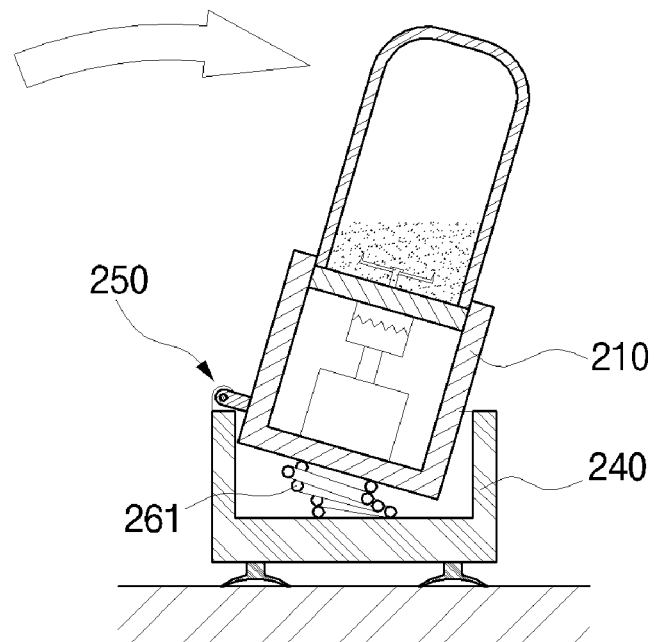

In this case, as shown in FIG. 15C, when the user pushes the main body 210, the main body 210 is rotated downwardly about the hinge part 250 and the coil spring 261 placed at the lower portion of the main body 210 is compressed.

Figure 15D:
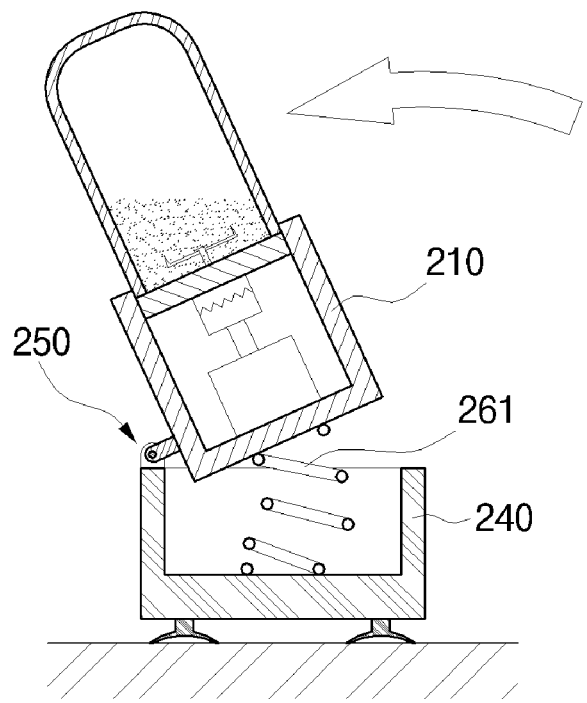
Figure 16A:
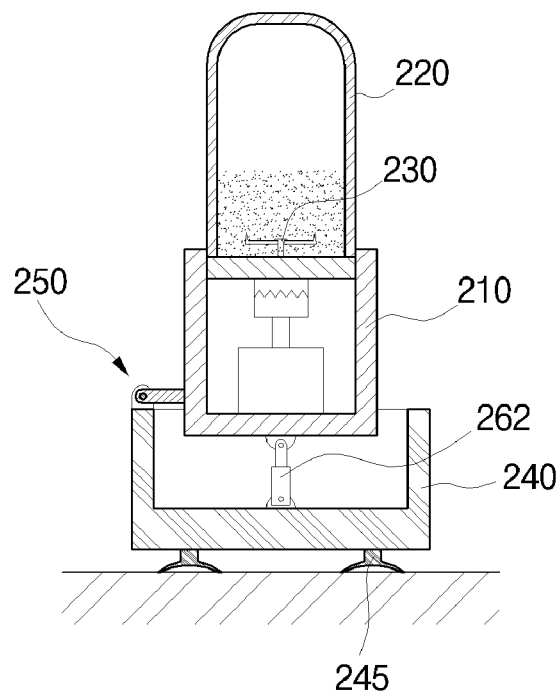
FIGS. 16A to 16D are sectional views illustrating an operation of a smart blender according to an eighth embodiment of the present invention.
Figure 16B:
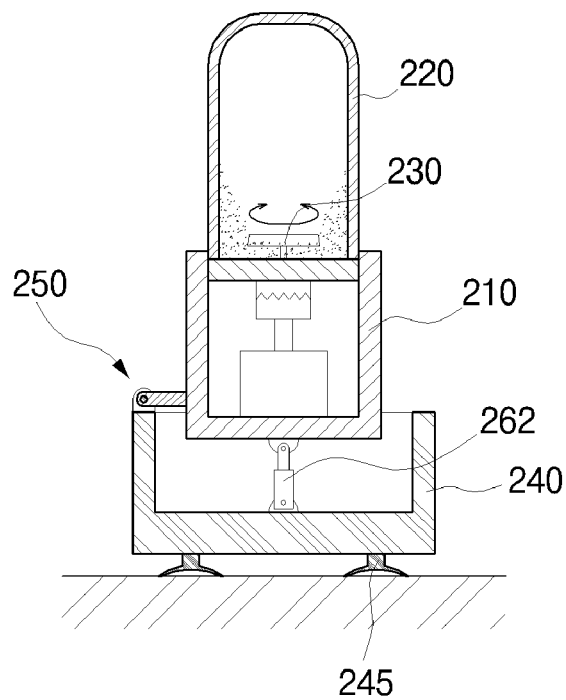
Figure 16C:
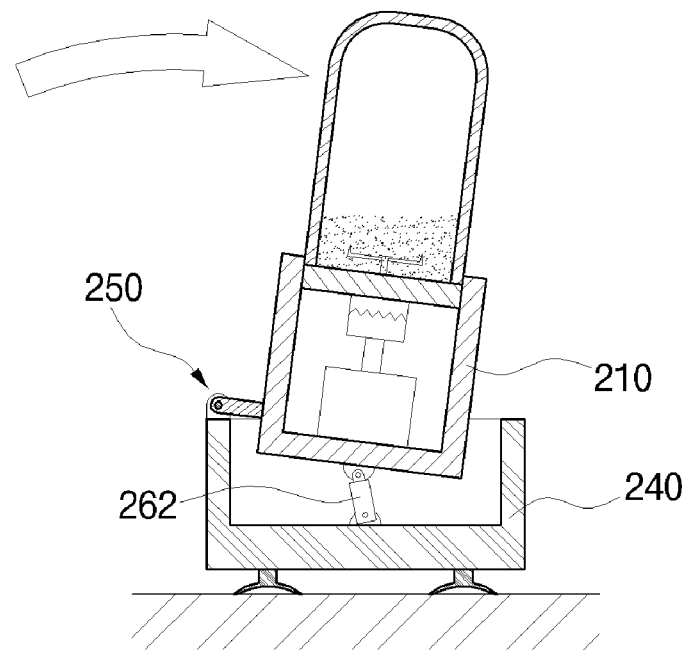
Figure 16D:
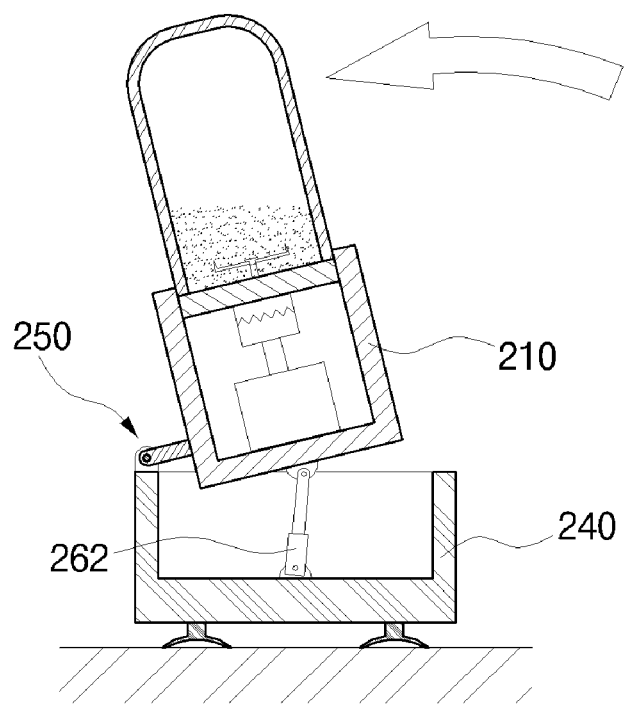
Figure 17A:
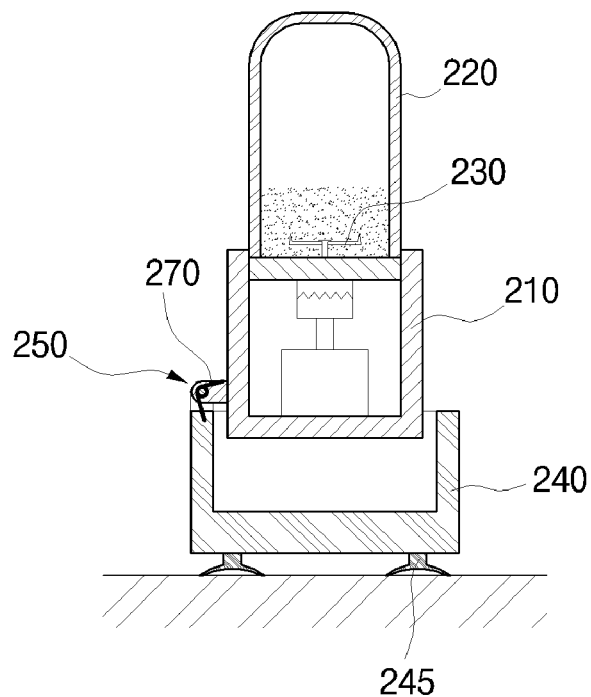
FIGS. 17A to 17D are sectional views illustrating an operation of a smart blender according to a ninth embodiment of the present invention.
Figure 17B:
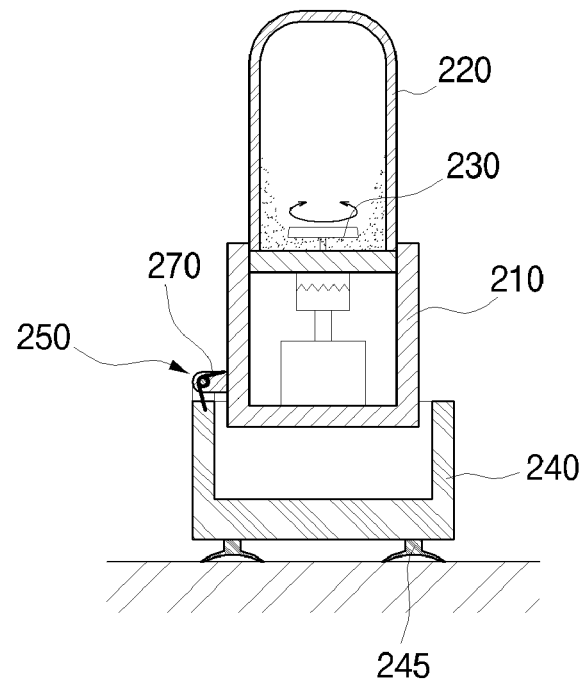
Figure 17C:
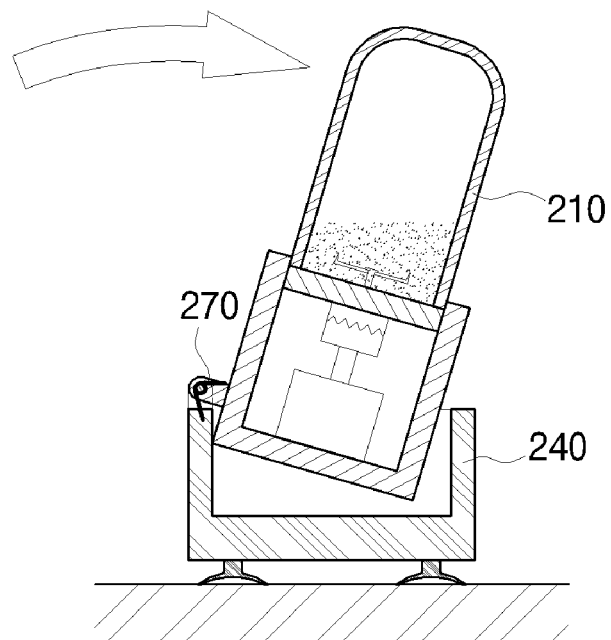
Figure 17D:
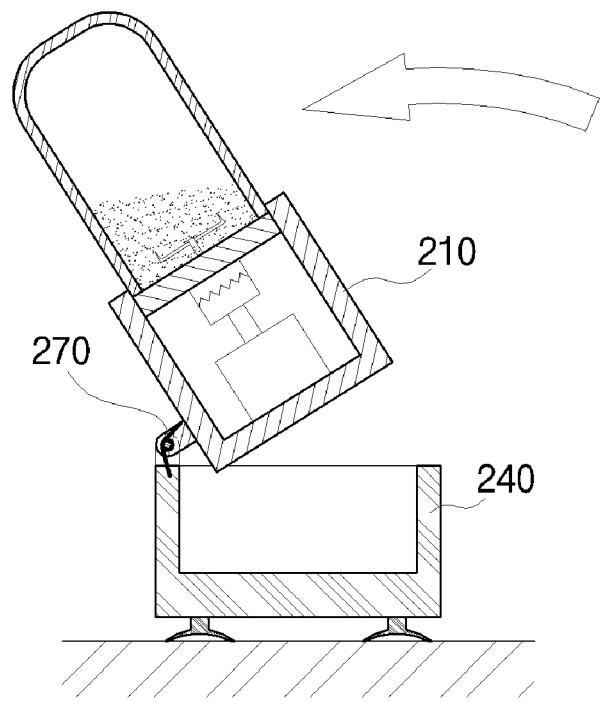

In the state where the coil spring 261 is compressed, if the pressing force is removed from the main body 210, the main body is rotated upwardly about the hinge part 250 by the elastic restoring force of the coil spring 261 compressed as illustrated in FIG. 15D.

As the main body 210 is rotated upwardly, the coil spring 261 is relaxed and the main body 210 is again rotated downwardly about the hinge part 250 by the elastic restoring force of the coil spring 261.

By the operations described above, the main body 210 is rotated in the vertical direction in an arc locus while the operations illustrated FIGS. 15C and 15D are semi-automatically repeated for a predetermined time period.

When the main body 210 is stopped after the predetermined time period, the user pushes or pulls the main body 210 to repeat the above process.

Accordingly, the food contained in the containing part 220 may be more effectively pulverized by the blade 230 while being evenly blended.

Meanwhile, since the base part 240 supporting the main body 210 is fixed to the bottom surface of the suction plate 245, the base part 240 is fixed without shaking so that the main body 210 is supported to be more shaken.

In addition, although noise and vibration are generated from the main body 210 due to the operation of the motor 215, since the coil spring 261 is coupled to the lower portion of the main body 210, the coil spring 261 may act as a buffer to attenuate the noise and vibration generated from the main body 210, so that the noise and vibration transmitted to the bottom surface is minimized.

Meanwhile, unlike the drawings of the present embodiment, the main body 210 may be hinge coupled to the base part 240 through the hinge part 250 such that the main body 210 is rotatable not in the vertical direction but in the left and right direction with respect to the base part 240.

That is, the hinge part 250 is coupled to the side surface of the main body 210, so that the main body 210 is hinge coupled to the base part 240 to be rotatable repeatedly in the left and right direction with respect to the base part 240.

The driving part supports the main body 210 such that the main body 210 moves in the left and right direction with respect to the base part 240 about the hinge part 250. In addition, as the main body is rotated in the left and right direction about the hinge part 250, the food contained in the containing part 220 is blended.

Since other details are the same as or similar to those of the sixth embodiment, the detailed descriptions will be omitted.

Eighth Embodiment

FIGS. 16A to 16D are sectional views illustrating an operation of a smart blender according to an eighth embodiment of the present invention.

As shown in FIGS. 16A to 16D, a smart blender according to the eighth embodiment includes a main body 210, a containing part 220, a blade 230, a base part 240, a hinge part 250, and a driving part.

When the eighth embodiment is compared with the seventh embodiment, the driving part of the eighth embodiment is different from that of the seventh embodiment. Thus, the following description will be focused on it.

According to the eighth embodiment, the driving part is formed of a motor-driven variable member 262 whose length is changed by an internal or external power source.

The motor-driven variable member 262 has one end making contact with the base part 240 and an opposite end making contact with the main body 210.

Thus, the length of the motor-driven variable member 262 is changed by the applied power source. As illustrated in FIGS. 16A to 16D, by the length variation of the motor-driven variable member 262, the main body 210 is repeatedly rotated in the vertical direction about the hinge part 250 in an arc locus.

In this case, one end and an opposite end, that is, a lower portion and an upper portion of the motor-driven variable member 262 are rotatably hinge-coupled to an upper surface of the base part 240 and a lower surface of the main body 210, so that the main body 210 may be smoothly rotated when the length of the motor-driven variable member 262 is changed.

In some cases, only one of both ends of the motor-driven variable member 262 is coupled to one of the base part 240 and the main body 210, and the other makes contact with the other of the base part 240 and the main body 210, so that the main body 210 may be rotated as the length of the motor-driven variable member 262 is changed.

As described above, the motor-driven variable member 262 may be an electric cylinder, a motorized ball screw, or the like which is well known in the art. If the length of the motor-driven variable member 262 is adjustable by electric power, the motor-driven variable member 262 may be sufficiently composed of only generally known components.

Unlike the seventh embodiment, in the eighth embodiment, by the motor-driven variable member 262, the main body 210 may be rotated repeatedly and automatically in the vertical direction in the arc locus without requiring the user to push or pull the main body 210, thereby providing convenience in use.

Since other details are the same as or similar to those of the seventh embodiment, the detailed descriptions will be omitted.

Ninth Embodiment

FIGS. 17A to 17D are sectional views illustrating an operation of a smart blender according to a ninth embodiment of the present invention.

As shown in FIGS. 17A to 17D, a smart blender according to the ninth embodiment includes a main body 210, a containing part 220, a blade 230, a base part 240, and a hinge part 250.

When the ninth embodiment is compared with the seventh and eighth embodiments, the hinge part 250 is different from those of the seventh and eighth embodiments. Thus, the description will be focused on it.

According to the ninth embodiment, a torsion spring 270 is installed to the hinge part 250.

One end of the torsion spring 270 is supported by the base part 240 and an opposite end is supported by the main body 210. The torsion spring 270 elastically supports the main body 210 in the vertical direction with respect to the base part 240.

As described above, when the user pushes the main body 210, as illustrated in FIGS. 17A to 17D, the main body 210 is rotated repeatedly and automatically in the vertical direction in the arc locus by the elastic restoring force of the torsion spring 270 compressed.

As in the present embodiment, when the torsion spring 270 is installed, the driving parts of the seventh and eighth embodiments may be removable. If necessary, the driving part of the seventh or eighth embodiment may be installed such that the main body 210 is more easily rotated in the vertical direction.

Since other details are the same as or similar to those of the seventh and eighth embodiments, the detailed descriptions will be omitted.

Tenth Embodiment

Figure 18:
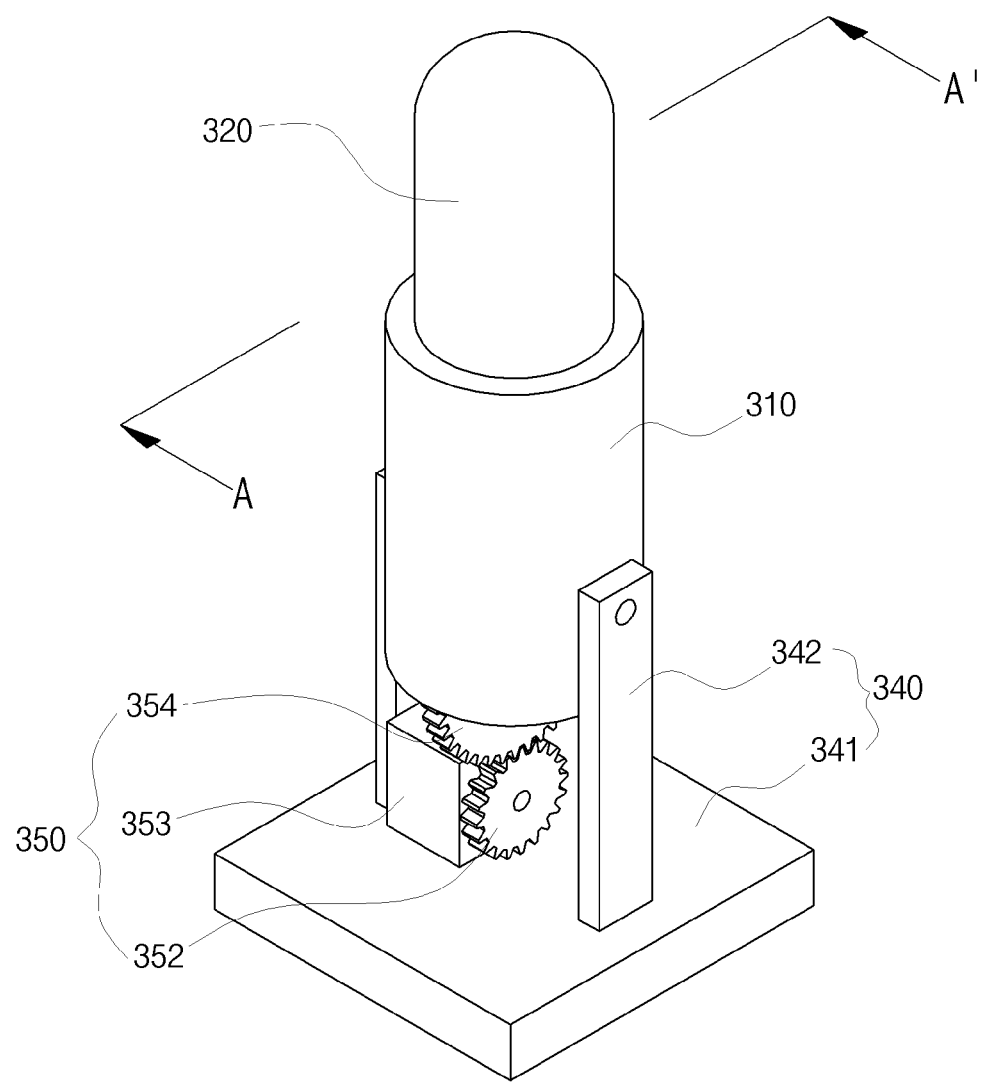
FIG. 18 is a perspective view of a smart blender according to a tenth embodiment of the present invention.
Figure 19:
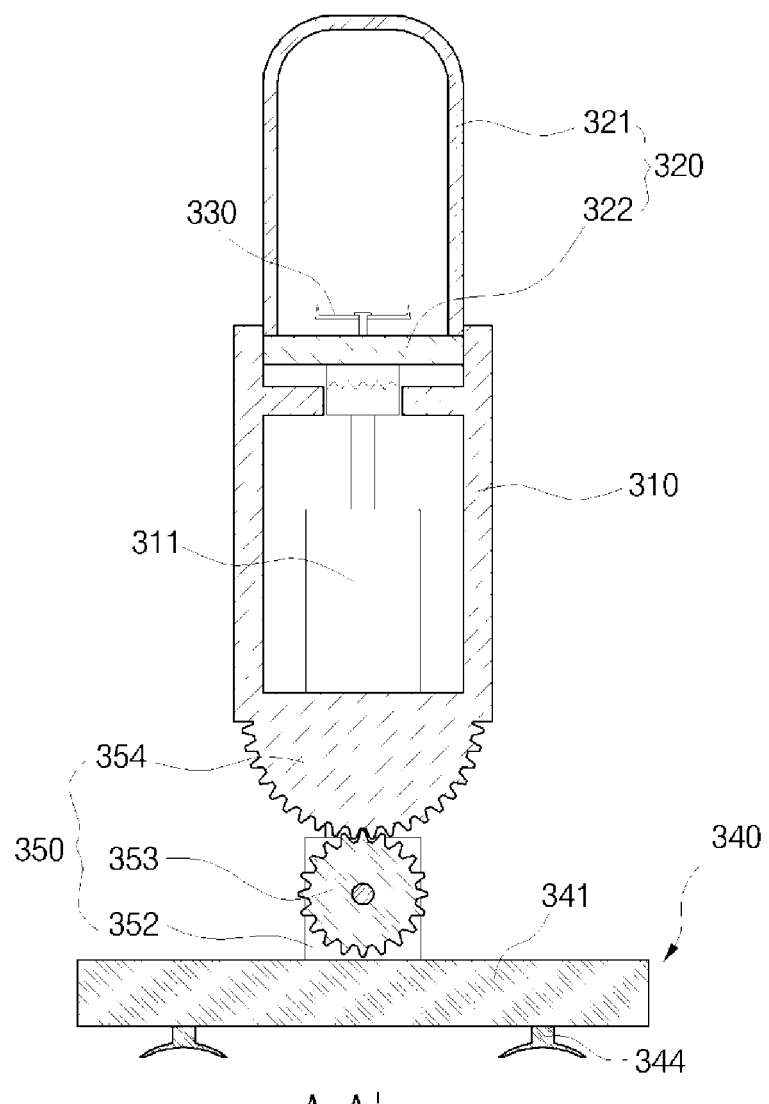
FIG. 19 is a sectional view taken along line A-A' of FIG. 18.
Figure 20:
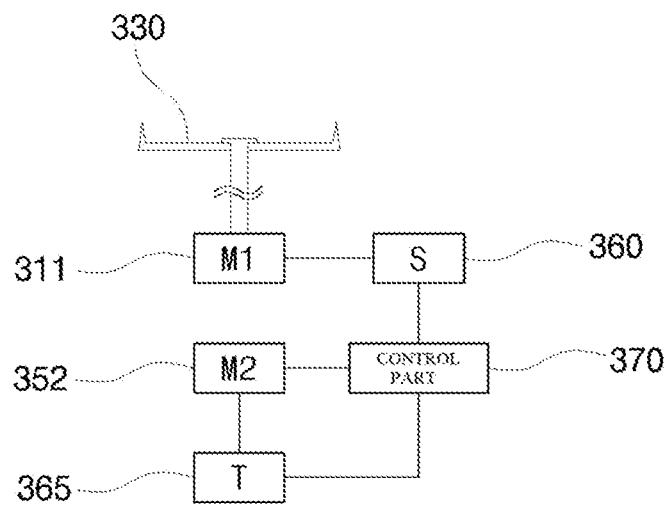
FIG. 20 is a view illustrating a configuration of the smart blender according to the tenth embodiment of the present invention.

FIG. 18 is a perspective view of a smart blender according to a tenth embodiment of the present invention. FIG. 19 is a section view illustrating the structure of the smart blender according to the tenth embodiment of the present invention. FIG. 20 is a view illustrating the configuration of the smart blender according to the tenth embodiment of the present invention. FIGS. 21A to 21D are views illustrating the process of operating the smart blender according to the tenth embodiment of the present invention.

As illustrated in FIGS. 18 to 21D, a smart blender according to the present invention, which pulverizes or blends food contained therein by a rotating blade, includes a main body 310, a containing part 320, a blade 330, a support 340, and a tilt forming part 350.

A first motor 311 is contained in the main body 310, and is operated by an inner power source such as a battery or the like or an external power source.

The containing part 320, in which food is contained, is detachably coupled to an upper portion of the main body 310.

The containing part 320 may include an upper cup member 321 formed in a substantially inverse U shape, and a support member 322 coupled to a lower portion of the upper cup member 321 to cover the lower portion of the upper cup member 321.

The support member 322 is detachably coupled to an upper surface of the main body 310.

As described above, the containing part 320 includes the upper cup member 321 and the support member 322, so that the containing part 320 may be independently separated from or coupled to the main body while the containing part 320 in which food is contained is sealed.

The blade 330 is installed in the containing part 320. In detail, the blade 330 is rotatably installed to an upper portion of the support member 322.

The blade 330 is rotated by the first motor 311 to pulverize and/or blend the food contained in the containing part 320.

The blade 330 is coupled to the first motor 311 installed to the main body 310 so that the blade 330 is rotated by the rotation of the first motor 311.

The support 340 is disposed on a lower portion of the main body 310 to support the main body 310 with respect to the ground.

The support 340 may be formed in various structures. According to the present embodiment, the support part 340 includes a support plate 341 disposed on a lower portion of the main body 310 and a support protrusion 342 protruding upwardly.

A side portion of the main body 310 is rotatably coupled to the support protrusion 342.

Thus, the main body 310 may be rotatably coupled to the support protrusion 342 such that the main body 310 is supported to be pivoted in the vertical direction with respect to the horizontal axis.

Preferably, a suction plate 344 of rubber or the like is installed on a lower portion of the support plate 341 such that the support 340 may be stably fixed with respect to the ground, thereby fixing the support 340 not to be shaken when the blender is operated.

As well as the structure of the present embodiment, the support 340 may be rotatably supported in a structure where the lower portion of the main body 310 and the support 340 are ball joint coupled to each other.

The tilt forming part 350 is disposed such that the main body 310 is tilted to be inclined to the support 340.

The main body 310 and the containing part 320 may be inclined by the tilt forming part 350 in a state of being directly arranged in the vertical direction on the support 340.

According to the present embodiment, the tilt forming part 350 includes a driving part that rotates the main body 310 such that the main body 310 is rotated in the vertical direction to be inclined.

It is sufficient that the driving part is capable of rotating the main body 310 by an external force.

According to the present embodiment, although the driving part may include a second motor 352, in some cases, the driving part 351 may include a cylinder, an LM guide, and the like.

The main body 310 is disposed to be inclined with respect to the support 340 by an operation of the driving part, that is, the second motor 352.

In more detail, according to the present embodiment, the tilt forming part 350 includes a driving gear 353 and a driven gear 354 in addition to the second motor 352.

The second motor 352 is installed to an upper portion of the support plate 341.

The driving gear 353 is installed to the second motor 352.

The driven gear 354 is coupled to the lower portion of the main body 310 such that the driven gear 354 is engaged with the driving gear 353.

Therefore, when power is applied to the second motor 352, the driven gear 354 is moved by the rotation of the driving gear 353 so that the main body is rotated to be inclined to the support 340.

In this case, the driven gear 354 may include a circular gear, a rack gear, or the line.

The second motor 352 may maintain the inclined state of the main body 310 at a predetermined angle and rotate the drive gear 353 in the forward and reverse directions to cause the main body 310 to be shaken left and right.

In the present embodiment, the tilt forming part 350 may include the second motor 352, the driving gear 353 and the driven gear 354. According to another gear structure (such as three worm gear coupling structure, spur gear coupling structure, or the like), the main body 310 may be rotated to be inclined.

In addition, in a state where the support 340 is hinge coupled to a side surface of the main body 310, the tilt forming part 350 is installed to a hinge portion of a side surface of the main body 310 so that the main body 310 may be disposed to be inclined to the support 340.

Due to the structure described above, the first motor 311 rotates the blade 330 and the second motor 352 rotates the main body 310.

Accordingly, the food or the like contained in the containing part 320 is first pulverized by the blade 330 rotated by the first motor 311.

In addition, the food or the like, which is pushed toward the inner wall of the containing part 320 by the centrifugal force generated by the rotation of the blade 330, is inclined at least two angles including a vertical line of the main body 310 by the second motor 352, so that the non-pulverized food or the like moves toward the center at which the blade 330 is disposed and is secondarily pulverized by the blade 330, so the food may be more efficiently pulverized.

Meanwhile, the present invention may further include a measuring part 360 and a control part 370.

The measuring part 360 detects rotation data of the blade.

In detail, the measuring part 360 detects a rotation speed of the blade 330, a torque of the first motor 311, a current value applied to the first motor 311, and the like.

The control part 370 controls the driving part, that is, the second motor 352.

The control part 370 operates the second motor 352 so that the main body 310 is inclined to the support 340 when the rotation state of the blade 330 detected by the measurement unit 360 is out of a predetermined reference range.

When the rotation speed of the blade 330 is detected by the measuring part 360 and the rotation speed of the blade 330 detected by the measuring part 360 is greater than a predetermined reference speed, the control part 370 determines that the food or the like contained in the containing part 320 is pushed to the vicinity of the inner wall of the containing part 320 by the centrifugal force generated by the rotation of the blade 330 so that the blade 330 is fast rotated, and operates the second motor 352 such that the main body 310 is inclined to the support 340.

In addition, when the torque of the first motor 311 by which the blade 330 is rotated is detected by the measuring part 360 and the torque of the blade 330 detected by the measuring part 360 is less than a predetermined reference torque, the control part 370 determines that the food or the like contained in the containing part 320 is pushed to the vicinity of the inner wall of the containing part 320 by the centrifugal force generated by the rotation of the blade 330 so that the torque of the first motor 311 is small, and operates the second motor 352 such that the main body 310 is inclined to the support 340.

In addition, when the current value applied to the first motor 311 by which the blade 330 is rotated is detected by the measuring part 360 and the current value detected by the measuring part 360 is less than a predetermined reference current value, the control part 370 determines that the food or the like contained in the containing part 320 is pushed to the vicinity of the inner wall of the containing part 320 by the centrifugal force generated by the rotation of the blade 330 so that the detected current value is small, and operates the second motor 352 such that the main body 310 is inclined to the support 340.

As described above, the main body 310 is disposed to be inclined by using the second motor 352, so that the food pushed to the vicinity of the inner wall of the containing part 320 moves toward the center at which the blade 330 is disposed by gravity.

Accordingly, the food, which has not yet been pulverized, may be more efficiently pulverized by the blade 130.

In addition, the present invention may further include a timer 365, which operates the second motor 352 every predetermined time period, without the measuring part 360 and the control part 370.

The second motor 352 is periodically operated by the timer 365 so that the main body 310 may be inclined at a predetermined angle or shaken in the left and right direction.

In addition, as described above, by the operation of the second motor 352, the main body 310 may be maintained in a state where the main body 310 is inclined to the vertical line or the main body 310 may be repeatedly shaken in the left and right direction with respect to the support 340.

Hereinafter, an operating process of the present invention configured as described above will be described.

Figure 21A:
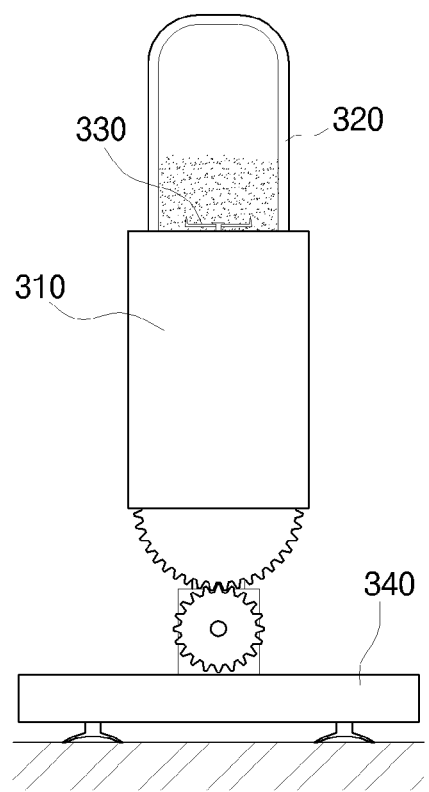
FIGS. 21A to 21D are views illustrating a process of operating the smart blender according to the tenth embodiment of the present invention.

As illustrated in FIG. 21A, the food is put into the containing part 320 and the containing part 320 is coupled to the main body 310.

In this case, the containing part 320 may be sealed by inserting the food therein, thereby preventing the food from flowing out or falling from the containing part 320.

In addition, the support 340 is stably fixed to the ground by the suction plate 344 mounted on the lower surface of the support 340.

Figure 21B:
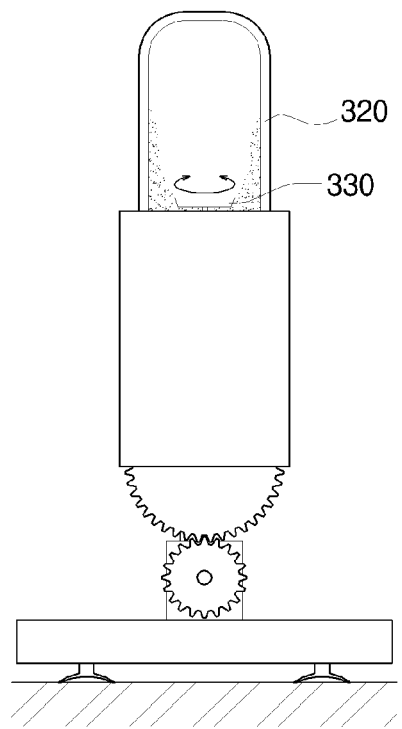

In this case, when the first motor 311 is operated and the blade 230 is rotated, as illustrated in FIG. 21B, the food is pushed toward the inner wall of the containing part 320 by the centrifugal force while being partially pulverized.

Thus, there exists a part of the food that is not pulverized by the blade 330.

In the initial state where the food is put into the containing part 320 and pulverized, the food acts as a load on the rotation of the blade 330, so that the rotational speed of the blade 330 is lowered and the torque of the motor 311 becomes high, so the current value applied to the first motor 311 becomes high.

As illustrated in FIG. 21B, when the food is pushed toward the inner wall of the containing part 320, the load lowering the rotation of the blade 330 is lowered. As a result, the rotation speed of the blade 330 is higher than that illustrated in FIG. 21A, the torque of the first motor 311 is lowered, and the current value applied to the first motor 311 is lowered.

As described above, when the measuring part 360 detects the rotation data of the blade 330, the controller 370 determines that the rotation state of the blade 330 is out of the predetermined reference range, and operates the second motor 352 so that the main body 310 is inclined to the support 340.

As a result, the food pushed to the vicinity of the inner wall of the containing part 320 is moved toward the center, at which the blade 330 exists, by gravity as the containing part 320 is elongated, so that the food, which has not yet been pulverized, may be more efficiently pulverized by the blade 330.

In this case, the main body 310 coupled to the containing part 320 may be disposed to be inclined at a multi-angle by rotating the main body 310 around the hinge coupling portion with the support 340 as the second motor 352 is operated.

Figure 21C:
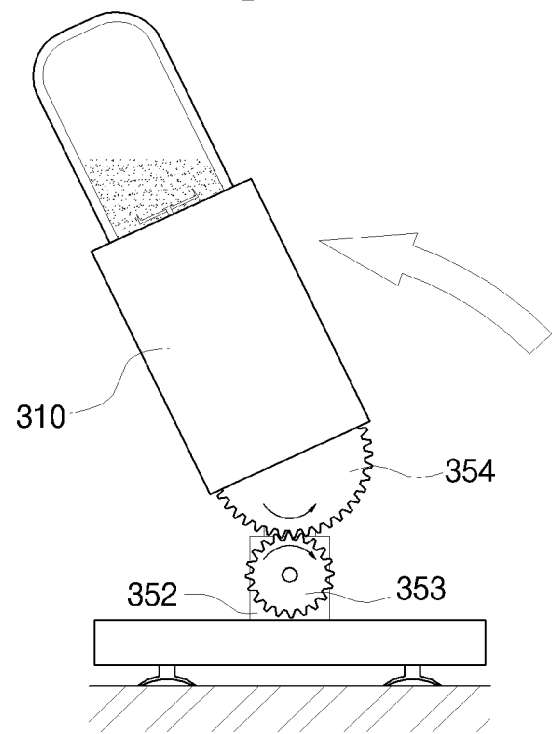
Figure 21D:
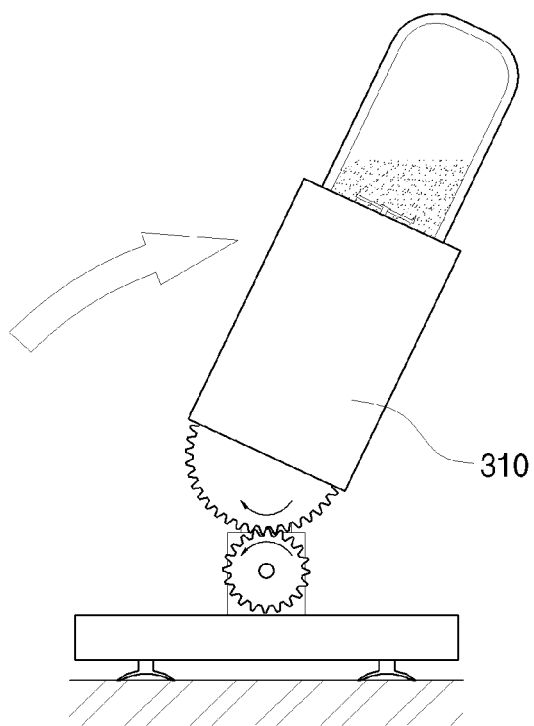

In addition, as illustrated in FIG. 21D, the inclined state of the main body 310 in the left and right direction is repeated while the main body 310 is inclined in the direction opposite to the state illustrated in FIG. 21C, such that the food contained in the containing part 320 is moved toward the blade 330, thereby evenly blending and pulverizing the food.

Meanwhile, when the measuring part 360 does not exist, the main body 310 may be inclined by the timer 365 every predetermined time period. When the timer 365 does not exist, if necessary, the user may operate the second motor 352 or may operate the second motor 352 from the beginning together with the first motor 311, so that the main body 310 is inclined.

Eleventh Embodiment

Figure 22:
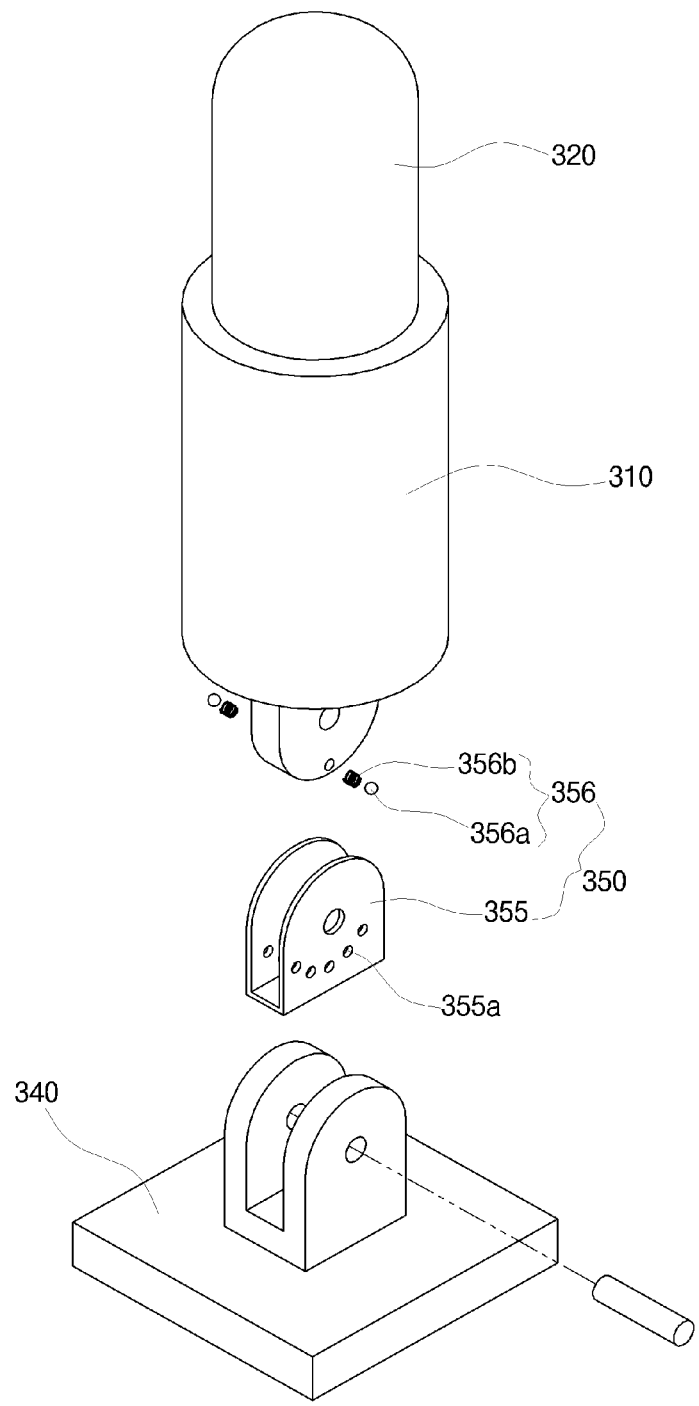
FIG. 22 is an exploded perspective view illustrating a smart blender according to eleventh embodiment of the present invention.
Figure 23:
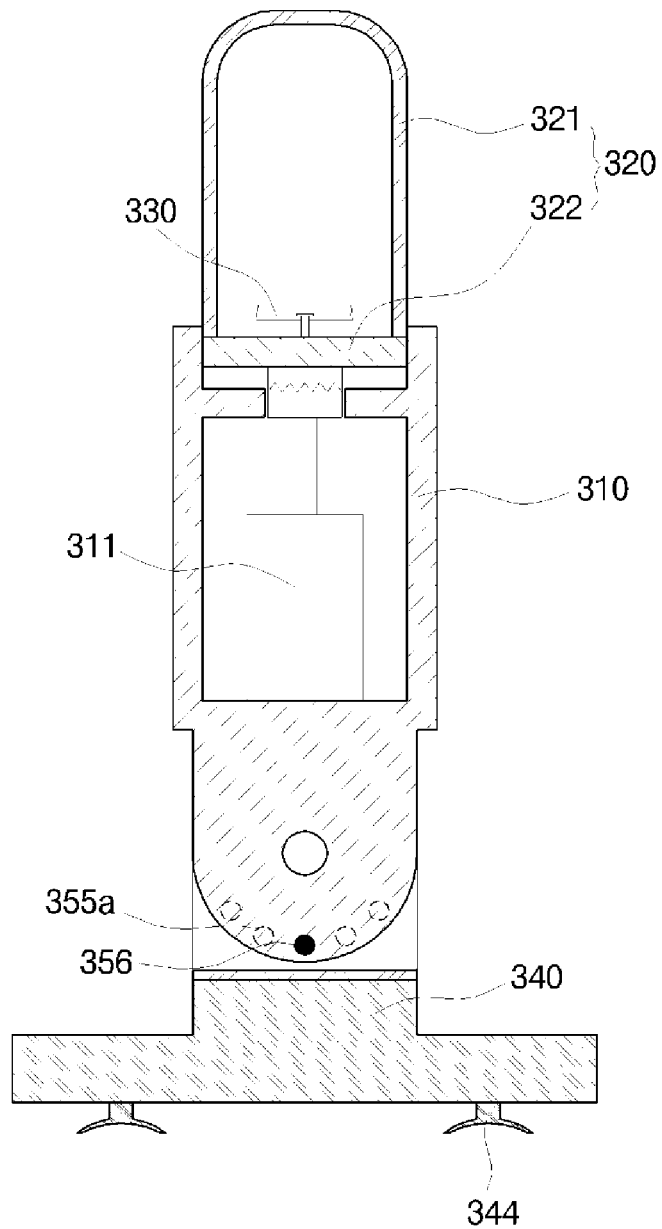
FIG. 23 is a sectional view illustrating the smart blender according to the eleventh embodiment of the present invention.

FIG. 22 is an exploded perspective view illustrating a smart blender according to eleventh embodiment of the present invention. FIG. 23 is a sectional view illustrating the smart blender according to the eleventh embodiment of the present invention. FIGS. 24A to 24D are views illustrating a process of operating the smart blender according to the eleventh embodiment of the present invention.

As illustrated in FIGS. 22 to 24D, a smart blender according to the eleventh embodiment includes a main body 310, a containing part 320, a blade 330, a support 340, and a tilt forming part 350.

Since the main body 310, the containing part 320 and the blade 330 are the same as those of the tenth embodiment, the details will be omitted and the following description will be focused on the tilt forming part 350.

The support 340 is hinge coupled to the main body 310 to support the main body 310.

The tilt forming part 350 is installed to the main body 310 and a hinge coupling portion of the support 340 such that the main body 310 is maintained inclined with respect to the support 340.

That is, the tilt forming part 350 allows the main body 310 to be inclined to the support 340 at a predetermined angle.

According to the present embodiment, the tilt forming part 350 includes a latch member 355 and a latch adjustment member 356.

The latch member 355 is installed to one of the main body 310 and the support 340 and formed with a plurality of latch grooves 355a.

The latch adjustment member 356 is installed to the other of the main body 310 and the support 340 and inserted into the latch groove 355a.

According to the present embodiment, the latch member 355 is installed to the support 340 and the latch adjustment member 356 is installed to the main body 310.

When the main body 310 is rotated, the latch adjustment member of the tilt forming part 350 is inserted into the latch groove 355a, so that the inclined state of the main body 310 and the containing part 320 is maintained.

The latch adjustment member 356 may be formed in various structures. According to the present embodiment, latch adjustment member 356 may include a ball member 356a inserted into the latch groove, and a spring 355b for elastically supporting the ball member 356a in a direction of the latch groove 355a.

In addition, the latch adjustment member 356 may include a plate spring (not shown) formed with a latch protrusion.

In this case, the latch protrusion is inserted into the latch groove 355a.

The latch adjustment member 356 and the latch member 355 may be formed in various structures other than the above-described structure.

As a result, when the main body is rotated, the ball member 356a is inserted into the latch groove 355a by the spring 356b so that the main body 310 is maintained in an inclined state at a predetermined angle.

Hereinafter, an operating process of the present invention configured as described above will be described.

Figure 24A:
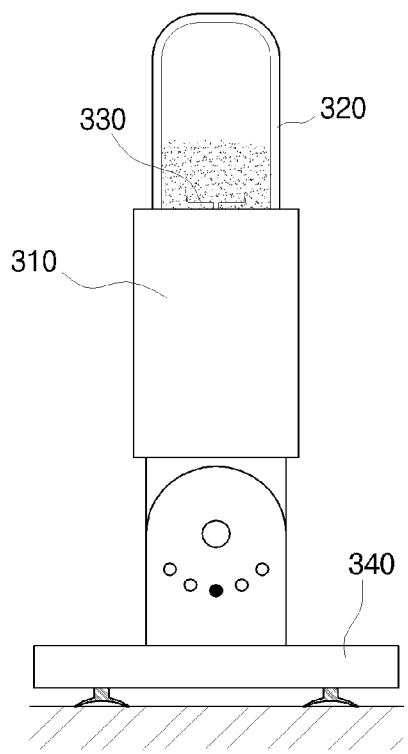
FIGS. 24A to 24D are views illustrating a process of operating the smart blender according to the eleventh embodiment of the present invention.

As illustrated in FIG. 24A, the food is put into the containing part 320 and the containing part 320 is coupled to the main body 310.

Figure 24B:
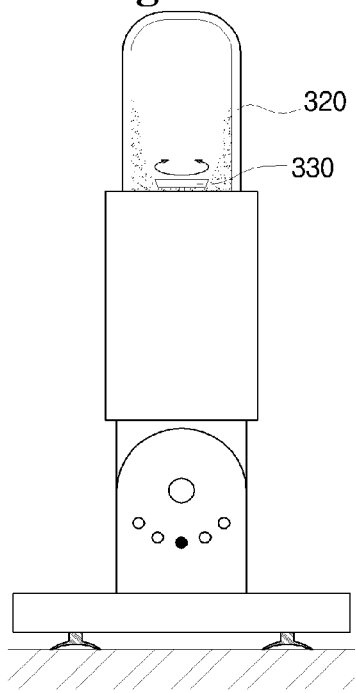

As illustrated in FIG. 24B, when the blade 330 is rotated by the operation of the first motor 311, the food is pushed toward the inner wall of the containing part 320 by the centrifugal force generated by the rotation of the blade 330 while being partially pulverized.

Thus, there exists a part of the food that is not pulverized by the blade 330.

Figure 24C:
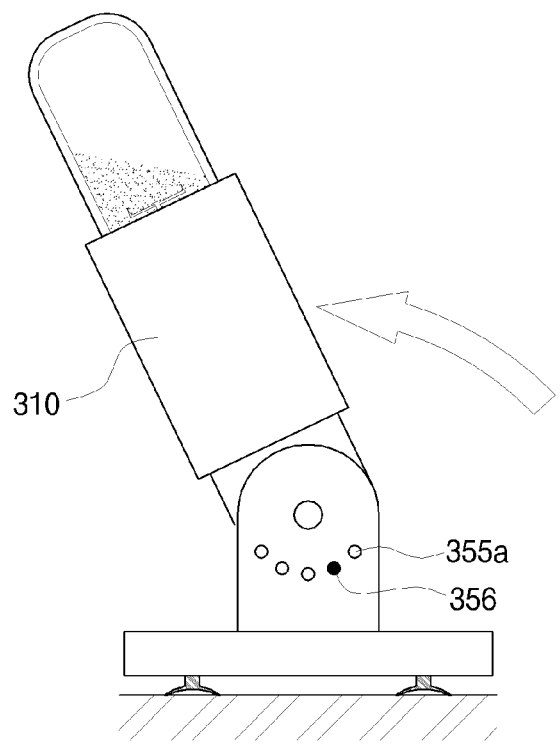
Figure 24D:
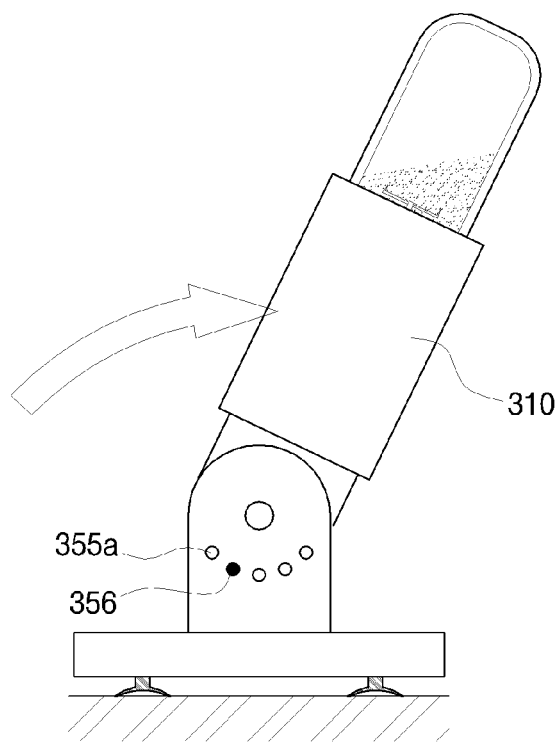

Accordingly, as illustrated in FIG. 24C or 24D, when the user tilts the main body 310 in one direction, the main body 310 is rotated around the hinge coupling portion with respect to the support 340.

In this case, while the ball member 356a is inserted into a new latch groove 355a by the elastic restoring force of the spring 356 compressed, the main body 310 is maintained in inclined at a predetermined angle.

Thus, the food pushed to the vicinity of the inner wall of the containing part 320 is pulverized while moving by gravity.

In addition, the main body 310 is further rotated about the hinge coupling portion of the support 340 according to the kind or degree of pulverizing of the food so that the food may be pulverized in a state where the main body 310 is stably fixed at various angles.

Since other details are the same as or similar to those of the tenth embodiment, the detailed descriptions will be omitted.

Twelfth Embodiment

Figure 25:
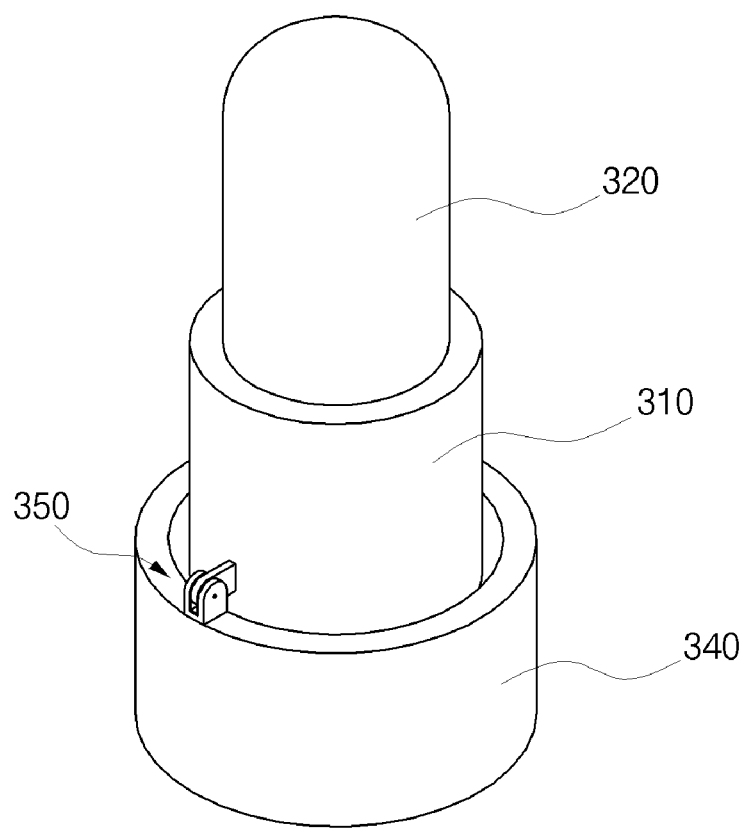
FIG. 25 is a perspective view of a smart blender according to a twelfth embodiment of the present invention.
Figure 26:
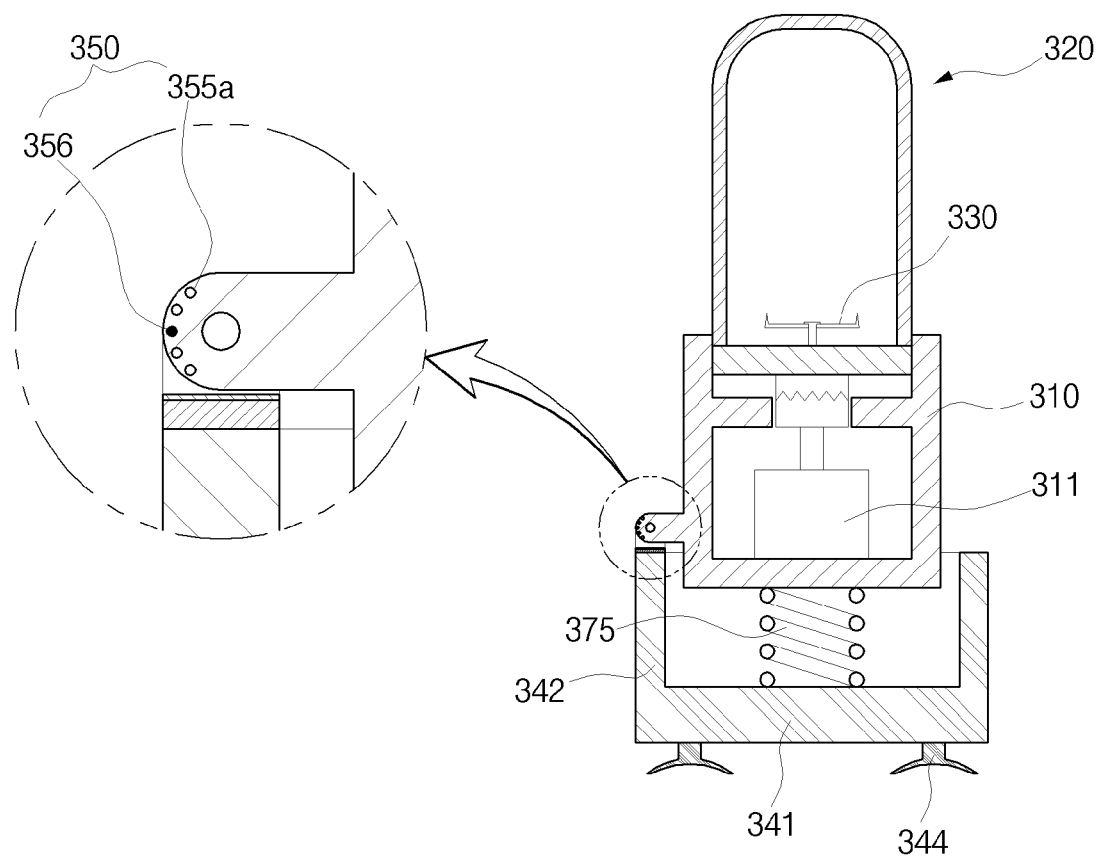
FIG. 26 is a sectional view illustrating the smart blender according to the twelfth embodiment of the present invention.

FIG. 25 is a perspective view of a smart blender according to a twelfth embodiment of the present invention. FIG. 26 is a sectional view illustrating the smart blender according to the twelfth embodiment of the present invention. FIGS. 27A to 27D are views illustrating a process of operating the smart blender according to the twelfth embodiment of the present invention.

As illustrated in FIGS. 25 to 27D, a smart blender according to the twelfth embodiment includes a main body 310, a containing part 320, a blade 330, a support 340, an elastic member 375, and a tilt forming part 350.

Since the main body 310, the containing part 320 and the blade 330 are the same as those of the eleventh embodiment, the details will be omitted and the following description will be focused on the elastic member 375 and the tilt forming part 350.

The support 340 includes a support plate 341 disposed on a lower portion of the main body 310 and a support protrusion 342 protruding upwardly from the support plate 341.

A side portion of the main body 310 is rotatably hinge-coupled to the support protrusion 342.

The elastic member 375 is disposed between the lower portion of the main body 310 and the support plate 341 to support elastically and upwardly the main body 310.

The main body 310 is stably supported by the elastic member 375 together with the support protrusion 342.

The tilt forming part 350 is installed near the side portion of the main body 310 which is a hinge coupling portion between the main body 310 and the support 340, such that the main body 310 is maintained inclined with respect to the support 340.

That is, the tilt forming part 350 allows the main body 310 to be inclined to the support 340 at a predetermined angle.

In this case, a force by which a stationary state of the main body 310 is maintained by the tilt forming part 350 is greater than the elastic force of the elastic member 375.

The detailed configuration and structure of the tilt forming part 350 is similar to those in the tenth embodiment.

Hereinafter, an operating process of the present invention configured as described above will be described.

Figure 27A:
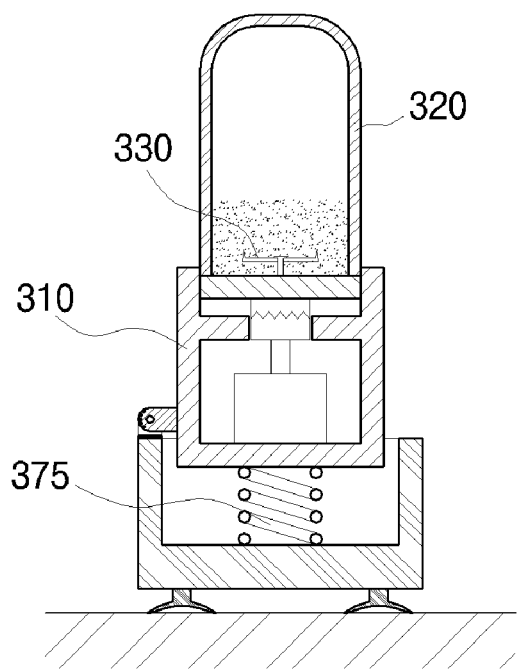
FIGS. 27A to 27D are views illustrating a process of operating the smart blender according to the twelfth embodiment of the present invention.

As illustrated in FIG. 27A, the food is put into the containing part 320 and the containing part 320 is coupled to the main body 310.

Figure 27B:
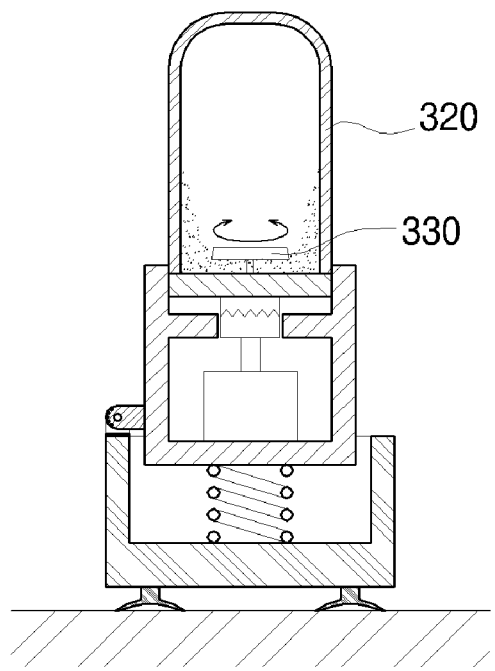

As illustrated in FIG. 27B, when the blade 330 is rotated by the operation of the first motor 311, the food is pushed toward the inner wall of the containing part 320 by the centrifugal force generated by the rotation of the blade 330 while being partially pulverized.

Thus, there exists a part of the food that is not pulverized by the blade 330.

Figure 27C:
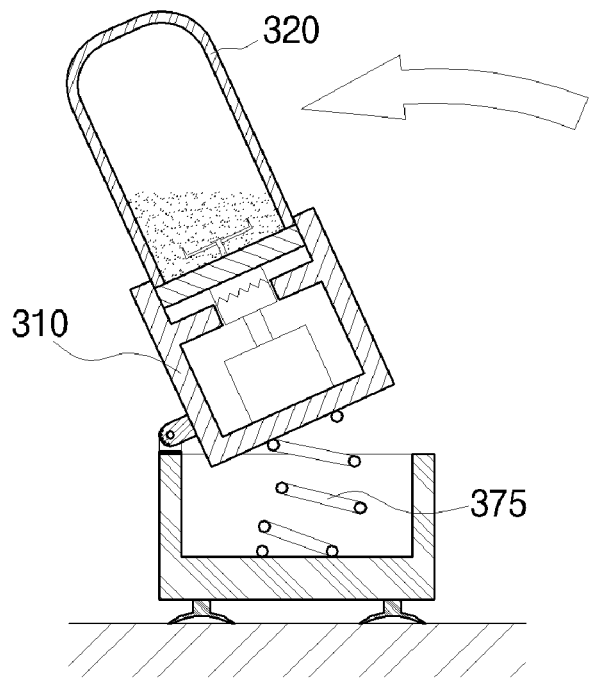
Figure 27D:
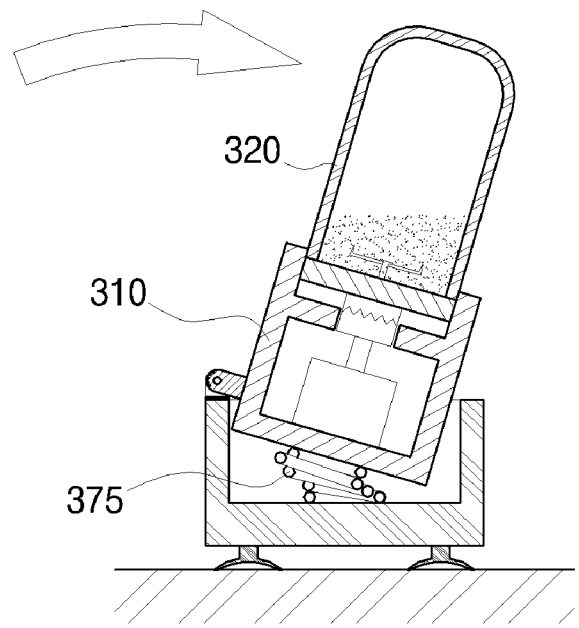

Accordingly, as illustrated in FIG. 27C or 27D, when the user tilts the main body 310 in one direction, the main body 310 is rotated around the hinge coupling portion with respect to the support 340.

In this case, since the lower portion of the main body 310 is supported by the elastic member 375, the may body 310 may be stably supported in the vertical direction.

Thus, the food pushed to the vicinity of the inner wall of the containing part 320 is pulverized by the blade 330 while moving by gravity.

In addition, the main body 310 is further rotated about the hinge coupling portion of the support 340 according to the kind or degree of pulverizing of the food so that the food may be pulverized in a state where the main body 310 is stably fixed at various angles.

In addition, since In this case, the force by which the stationary state of the main body 310 is maintained by the tilt forming part 350 is greater than the elastic force of the elastic member 375, the main body 310 may be prevented from being arbitrarily rotated by the elastic force of the elastic member 375.

Since other details are the same as or similar to those of the eleventh embodiment, the detailed descriptions will be omitted.

Thirteenth Embodiment

Figure 28:
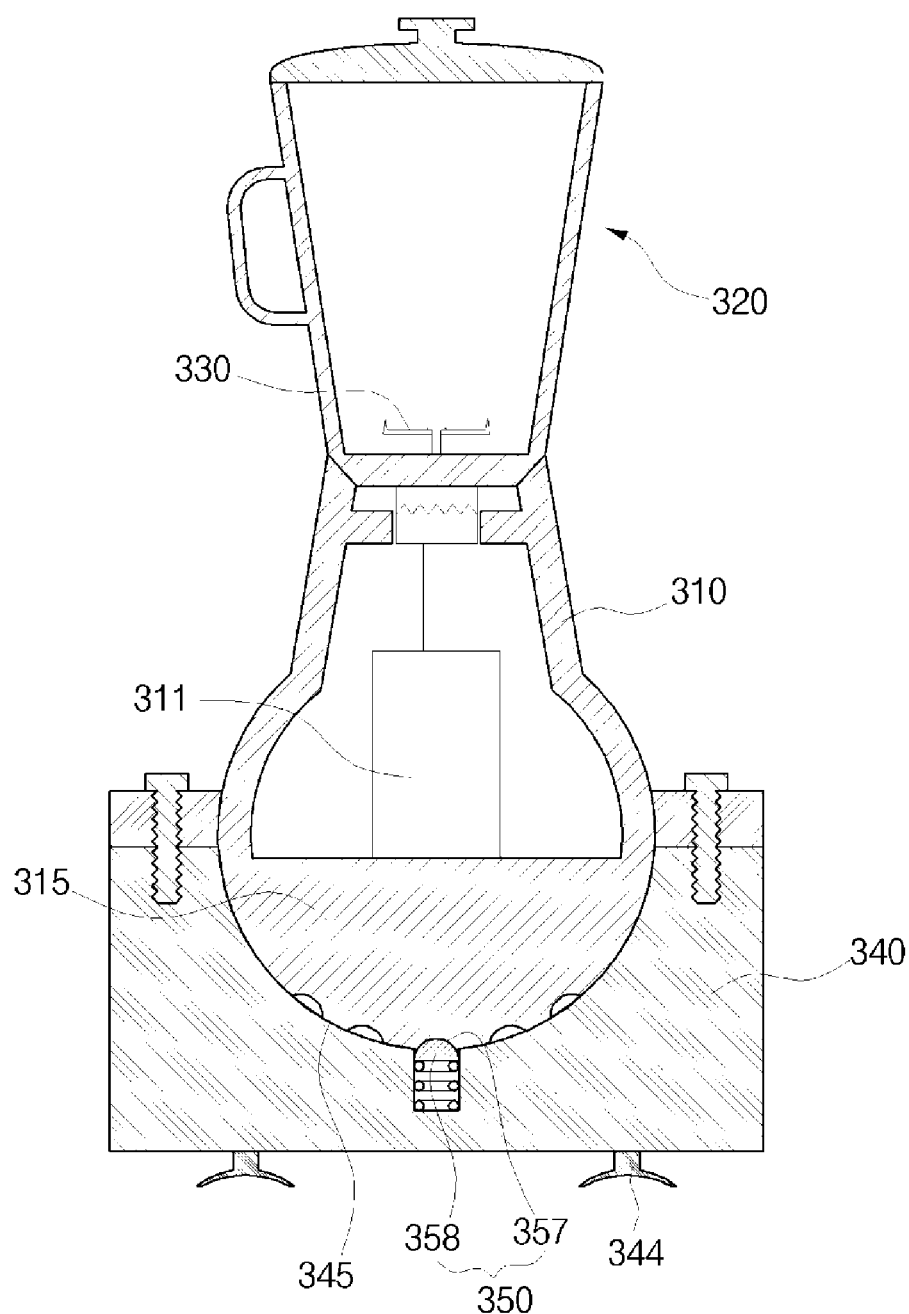
FIG. 28 is a sectional view illustrating a smart blender according to a thirteenth embodiment of the present invention.

FIG. 28 is a sectional view illustrating a smart blender according to a thirteenth embodiment of the present invention. FIGS. 29A to 29D are views illustrating a process of operating the smart blender according to the thirteenth embodiment of the present invention.

Figure 29A:
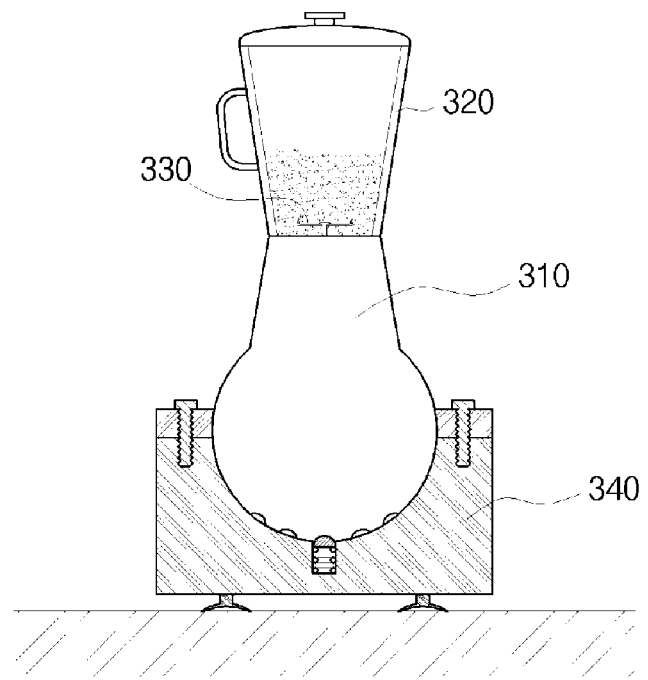
FIGS. 29A to 29D are views illustrating a process of operating the smart blender according to the thirteenth embodiment of the present invention.
Figure 29B:
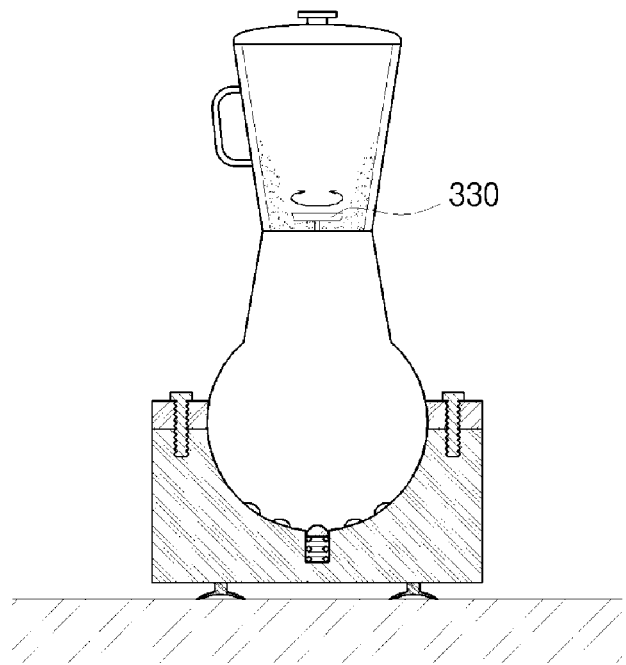
Figure 29C:
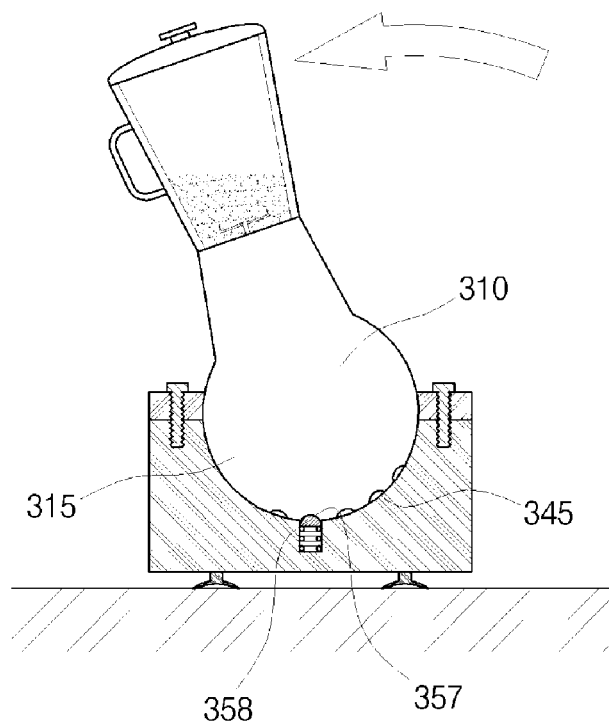
Figure 29D:
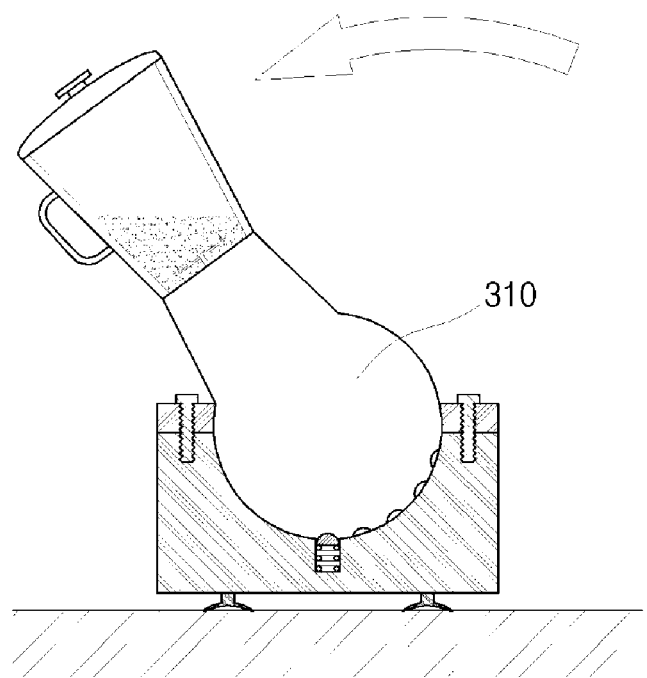

As illustrated in FIGS. 28 to 29D, a smart blender according to the thirteenth embodiment includes a main body 310, a containing part 320, a blade 330, a support 340, and a tilt forming part 350.

Since the containing part 320 and the blade 330 are the same as those of the eleventh embodiment, the details will be omitted and the following description will be focused on the main body 310 and the support 340.

An insertion protrusion 315 having a dome shape is formed on the lower portion of the main body 110, and an insertion groove 345 is formed on an upper portion of the support 340, which is rotated while the insertion protrusion 315 is inserted thereinto.

Thus, when the main body 310 is rotated, the main body 310 may be supported while the insertion protrusion 315 is rotated in the insertion groove 345.

In this case, the insertion protrusion 315 is inserted into the insertion groove 345 such that the insertion protrusion 315 is coupled to the insertion groove 345 without being arbitrarily separated from the insertion groove 345.

In addition, the tilt forming part 35 allows the main body 310, which is rotated by the insertion protrusion 315 and the insertion groove 345, to be maintained in a state where the main body 310 is rotated at a predetermined angle.

According to the present embodiment, the tilt forming part 350 includes a fixing groove 357 and a fixing protrusion 358.

The plurality of fixing grooves 357 are formed on the insertion protrusion 315.

The fixing protrusion 358 protrudes from the support 340 and is inserted into the fixing groove 357.

In this case, the fixing protrusion 358 may be inserted into the fixing groove 357 by the elastic force thereof, and may be inserted into the fixing groove 357 while being elastically supported by a spring or the like.

As illustrated in FIGS. 29A to 29D, the main body 310 may be rotated around the support 340 by inserting the fixing protrusion 358 into the fixing groove 357, so that the main body 310 may be maintained inclined at a multi-angle.

Unlike the present embodiment, the fixing groove 357 may be formed in the support 340 and the fixing protrusion 358 may be formed on the insertion protrusion 315.

In addition, the tilt forming part 350 may be formed in various structures other than the structure of the present embodiment.

For example, the tilt forming part 350 may include an outer peripheral surface of the insertion protrusion 315 and an inner peripheral surface of the insertion groove 345 which are in contact with each other.

In this case, the outer peripheral surface of the insertion protrusion 315 and the inner peripheral surface of the insertion groove 345 are tightly closed to each other, so that the main body 310 may be maintained in the inclined state by the friction generated by the contact between the outer peripheral surface of the insertion protrusion 315 and the inner peripheral surface of the insertion groove 345.

Since other details are the same as or similar to those of the above-described embodiments, the detailed descriptions will be omitted.

The smart blender and the method of operating the same according to the present invention are not limited to the above-described embodiments, but may be variously modified and practiced within the scope of the technical idea of the present invention.

INDUSTRIAL APPLICABILITY

The present invention may be applied to a blender for blending and pulverizing foods.

The invention claimed is:

1. A smart blender which pulverizes or blends food contained therein by a rotating blade,
wherein, when the smart blender is slanted by an external force and the external force is removed, the smart blender blends the food contained therein while repeatedly shaking side to side, the smart blender comprising:
a main body containing a motor;
a containing part coupled to an upper portion of the main body to contain food;
the blade installed to the main body or the containing part and rotated by the motor to pulverize or blend the food;
a first support disposed on a lower portion of the main body; and
a connecting member for connecting the first support to the main body,
wherein the connecting member allows the main body to shake side to side based on the first support by the external force, and
wherein the connecting member is formed of an elastic material such that the connecting member is elastically deformed by the external force and elastically restored when the external force is removed, has one end coupled to the first support and an opposite end coupled to the main body, and is elastically deformed by the external force when the main body is slanted by the external force, and
the main body shakes side to side by an elastic restoring force of the connecting member when the external force is removed.

2. The smart blender of claim 1, wherein the connecting member is formed of a coil spring disposed vertically.

3. The smart blender of claim 2, wherein the connecting member has the one end coupled to an upper surface of the first support and the opposite end coupled to a lower surface of the main body to support the main body such that the main body stands up with respect to the first supporting a free state, and
the connecting member is elastically compressed by the external force pressing the containing part.

4. A smart blender which pulverizes or blends food contained therein by a rotating blade, the smart blender comprising:
a main body containing a motor;
a containing part coupled to an upper portion of the main body to contain food;
the blade installed to the main body or the containing part and rotated by the motor to pulverize or blend the food; and
a support coupled to a lower portion of the main body,
wherein the lower portion of the main body is slanted against the support by an external force,
wherein a dome-shaped insertion protrusion is formed on the lower portion of the main body, and
an insertion groove is formed in an upper portion of the support such that the insertion protrusion is rotated while being inserted into the insertion groove.

5. The smart blender of claim 4, wherein the insertion protrusion is formed with a fixing groove,
the support is formed with a fixing protrusion inserted into the fixing groove, and the fixing protrusion is inserted into the fixing groove such that the main body remains in a state.

6. The smart blender of claim 4, wherein a lower portion of the main body is formed in a dome shape and is formed with a rotation protrusion having a gear,
a driving motor gear-engaged with the rotation protrusion is installed on the support, and
the main body is slanted against the support by a rotation of the rotation protrusion.

7. A smart blender which pulverizes or blends food contained therein by a rotating blade, the smart blender comprising:
a main body containing a motor;
a containing part coupled to the main body to contain food;
the blade installed to the main body or the containing part and rotated by the motor to pulverize or blend the food;
a base part disposed on a lower portion of the main body; and a driving part disposed between the base part and the main body to support the main body vertically with respect to the base part, wherein the driving part supports the main body such that the main body moves vertically and horizontally with respect to the base part, and the food contained in the containing part is blended as the main body moves vertically or horizontally by the driving part, wherein the driving part is formed of an elastic material such that the driving part is elastically deformed by the external force and elastically restored when the external force is removed, and has one end coupled to the base part and an opposite end coupled to the main body.

8. The smart blender of claim 7, wherein the driving part includes a coil spring, and has a lower end coupled to an upper surface of the base part and an upper end coupled to an upper surface of the main body.

9. The smart blender of claim 7, further comprising a hinge part for hinge-coupling the main body to the base part such that the main body is rotatable vertically with respect to the base part, wherein the driving part supports the main body such that the main body moves vertically with respect to the base part about the hinge part, and the food contained in the containing part is blended as the main body is vertically rotated about the hinge part.

10. The smart blender of claim 9, wherein the driving part includes a spring having one end coupled to the base part and an opposite end coupled to the main body, and the main body is repeatedly rotated in the vertical direction about the hinge part by an elastic restoring force of the spring.

11. The smart blender of claim 9, wherein the driving part is a motor-driven variable member, a length of which is varied by power, the motor-driven variable member has one end making contact with the base part and an opposite end making contact with the main body, the main body repeatedly rotates in the vertical direction about the hinge part by a change of the length of the motor-driven variable member, and the motor-driven variable member has a lower end hinge-coupled to an upper surface of the base part and an upper end hinge-coupled to a lower surface of the main body.

12. The smart blender of claim 7, further comprising a hinge part for hinge-coupling the main body to the base part such that the main body is rotatable horizontally with respect to the base part, wherein the driving part supports the main body such that the main body moves horizontally with respect to the base part about the hinge part, and the food contained in the containing part is blended as the main body is horizontally rotated about the hinge part.

13. A smart blender which pulverizes or blends food contained therein by a rotating blade, the smart blender comprising:

a main body containing a first motor;

a containing part detachably coupled to an upper portion of the main body to contain food;

the blade installed into the containing part and rotated by the motor to pulverize or blend the food;

a support coupled to the main body to rotatably support the main body; and a tilt forming part for tilting the main body with respect to the support such that the main body is disposed to be inclined with respect to the support, wherein the main body and the containing part are disposed to be inclined with respect to the support by the tilt forming part, and wherein the tilt forming part maintains the main body in a state where the main body is inclined at a predetermined angle with respect to the support.

14. The smart blender of claim 13, wherein the tilt forming part includes a driving part for rotating the main body such that the main body is vertically tilted, and the main body is disposed to be inclined with respect to the support by an operation of the driving part.

15. The smart blender of claim 14, wherein the driving part includes a second motor.

16. The smart blender of claim 15, wherein the tilt forming part includes:

a driving gear installed to the second motor; and a driven gear coupled to a lower portion of the main body and engaged with the driving gear, wherein the main body is rotated while being inclined with respect to the support as the driven gear moves by a rotation of the driving gear by the second motor.

17. The smart blender of claim 14, further comprising:

a measuring part for detecting rotation data of the blade; and a control part for controlling an operation of the driving part, wherein, when a rotation state of the blade detected by the measuring part is out of a preset reference range, the control part operates the driving part such that the main body is disposed to be inclined with respect to the support.

18. The smart blender of claim 14, wherein the main body repeatedly shakes side to side with respect to the support by an operation of the driving part.

19. The smart blender of claim 13, wherein the support is hinge coupled to a lower portion of the main body to support the main body, and the tilt forming part is installed to a hinge coupling portion between the main body and the support such that the main body is maintained inclined with respect to the support.

20. The smart blender of claim 13, wherein the support includes:

a support plate disposed on a lower portion of the main body; and a support protrusion protruding upwardly from the support plate, wherein a side portion of the main body is hinge coupled to the support protrusion, an elastic member is disposed between the lower portion of the main body and the support plate to elastically and upward support the main body, the tilt forming part is installed to a hinge coupling portion between the main body and the support such that the main body is maintained inclined with respect to the support, and a force maintaining a stationary state of the main body by the tilt forming part is greater than an elastic force of the elastic member.

21. The smart blender of claim 13, wherein the tilt forming part includes:

a latch member installed to one of the main body and the support and formed with a plurality of latch grooves; and a latch adjustment member installed to the other of the main body and the support and inserted into the latch groove, and wherein, when the main body is rotated, the latch adjustment member is inserted into the latch groove to maintain the main body and the containing part in an inclined state.

22. The smart blender of claim 13, wherein the tilt forming part includes:

a fixing groove formed in the insertion protrusion; and a fixing protrusion protruding from the support and inserted into the fixing groove, and wherein the fixing protrusion is inserted into the fixing groove such that a state of the main body is maintained.

* * * * *